US012750817B2

(12) United States Patent
Lyu et al.

(10) Patent No.: US 12,750,817 B2
(45) Date of Patent: Sep. 29, 2026

(54) PAGING PROCESSING METHOD AND APPARATUS, DEVICE, AND STORAGE MEDIUM

(71) Applicant: QUECTEL WIRELESS SOLUTIONS CO., LTD., Shanghai (CN)

(72) Inventors: Ling Lyu, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 344 days.

(21) Appl. No.: 18/505,917

(22) Filed: Nov. 9, 2023

(65) Prior Publication Data

US 2024/0080803 A1 Mar. 7, 2024

Related U.S. Application Data

(63) Continuation of application No. PCT/CN2021/116966, filed on Sep. 7, 2021.

(30) Foreign Application Priority Data

Jun. 9, 2021 (CN) ........................ 202110643310.5

(51) Int. Cl.
*H04W 68/02* (2009.01)
*H04W 72/0446* (2023.01)
*H04W 72/232* (2023.01)

(52) U.S. Cl.
CPC ....... *H04W 68/02* (2013.01); *H04W 72/0446* (2013.01); *H04W 72/232* (2023.01)

(58) Field of Classification Search
None
See application file for complete search history.

(56) References Cited

U.S. PATENT DOCUMENTS

2019/0223145 A1 7/2019 Jung et al.
2019/0349885 A1* 11/2019 Koskela ............... H04W 24/08
(Continued)

FOREIGN PATENT DOCUMENTS

CN 108282862 7/2018
CN 108811083 11/2018
(Continued)

OTHER PUBLICATIONS

International Search Report and Written Opinion in International Appln. No. PCT/CN2021/116966, mailed on Mar. 9, 2022, 17 pages (with English machine translation).
(Continued)

*Primary Examiner* — Duc T Duong
(74) *Attorney, Agent, or Firm* — Fish & Richardson P.C.

(57) ABSTRACT

A paging processing method and apparatus, a device, and a storage medium are provided. An example method includes: obtaining user equipment (UE) parameters for paging; obtaining paging parameters in a paging message, wherein the paging parameters comprise a quantity of paging frames comprised in one paging cycle corresponding to the paging message, a quantity of paging occasions comprised in one paging frame, a quantity of slots in each paging occasion, and a quantity of interval slots between two consecutive times of UE paging in one paging occasion, and the paging message associates with a paging downlink control information (DCI); determining, based on the UE parameters for paging and the paging parameters, a target index position of the paging DCI of a UE in a target slot in a target paging occasion in a target paging frame; and sending the target index position and the paging message to the UE.

20 Claims, 6 Drawing Sheets

(56) References Cited

U.S. PATENT DOCUMENTS

| | | | | |
|---|---|---|---|---|
| 2019/0357171 | A1 | 11/2019 | Miao et al. | |
| 2019/0373577 | A1 | 12/2019 | Agiwal | |
| 2019/0394749 | A1* | 12/2019 | Islam | H04W 72/23 |
| 2020/0229132 | A1 | 7/2020 | Chen et al. | |
| 2020/0280957 | A1* | 9/2020 | Gao | H04L 5/0053 |
| 2021/0219263 | A1* | 7/2021 | Gao | H04W 52/028 |
| 2022/0124674 | A1* | 4/2022 | Babaei | H04W 68/02 |
| 2022/0279479 | A1* | 9/2022 | Nader | H04W 68/02 |
| 2022/0322284 | A1* | 10/2022 | He | H04W 4/08 |
| 2023/0189147 | A1* | 6/2023 | Bala | H04W 52/0229 370/311 |
| 2023/0292326 | A1* | 9/2023 | Jung | H04L 5/0053 |
| 2024/0031983 | A1* | 1/2024 | Ye | H04W 52/0219 |
| 2024/0073862 | A1* | 2/2024 | Kaikkonen | H04W 68/02 |
| 2024/0097846 | A1* | 3/2024 | Su | H04L 5/005 |
| 2024/0163844 | A1* | 5/2024 | Ma | H04W 68/02 |
| 2024/0163934 | A1* | 5/2024 | Freda | H04W 76/27 |
| 2024/0298297 | A1* | 9/2024 | He | H04W 52/0216 |
| 2024/0373499 | A1* | 11/2024 | Agiwal | H04W 48/12 |

FOREIGN PATENT DOCUMENTS

| | | |
|---|---|---|
| CN | 109803376 | 5/2019 |
| CN | 110446258 | 11/2019 |
| CN | 110475319 | 11/2019 |
| CN | 111567107 | 8/2020 |
| CN | 112752341 | 5/2021 |
| CN | 113316236 | 8/2021 |
| WO | WO 2020067729 | 4/2020 |

OTHER PUBLICATIONS

Office Action in Chinese Appln. No. 202110643310.5, mailed on Sep. 19, 2022, 17 pages (with English machine translation).

Qualcomm Incorporated, "Paging Occasion Calculation for NR," 3GPP TSG-RAN WG2 Meeting #101bis, R2-1804999, Sanya, China, Apr. 16-20, 2018, 6 pages.

Extended European Search Report in European Appln No. 21944787.7, dated May 3, 2024, 6 pages.

* cited by examiner

RAN areas and tracking areas

CORESET configuration example

PAGING PROCESSING METHOD AND APPARATUS, DEVICE, AND STORAGE MEDIUM

CROSS-REFERENCE TO RELATED APPLICATIONS

This application is a continuation of International Application No. PCT/CN2021/116966, filed on Sep. 7, 2021, which claims priority to Chinese Patent Application No. 202110643310.5, filed on Jun. 9, 2021 and entitled "PAGING PROCESSING METHOD AND APPARATUS, DEVICE, AND STORAGE MEDIUM". The disclosures of the aforementioned applications are hereby incorporated by reference in their entirety.

TECHNICAL FIELD

The present application relates to the field of communications technologies, and specifically, to a paging processing method and apparatus, a device, and a storage medium.

BACKGROUND

With the development of mobile communication technologies, a new generation wireless evolution system—a 5th generation mobile communications system (5G) adopts a large-scale multiple input multiple output (MIMO) technology, a non-orthogonal multiple access technology, a co-time co-frequency full duplex communications technology, a novel encoding technology, a high-order modulation technology, and the like, so that a peak rate can be up to a standard of Gbit/s, so as to meet large-scale data transmission such as high-definition video and virtual reality; a delay level of an air interface needs to be about 1 ms, to meet real-time applications such as automatic driving and remote medical; and an ultra-large network capacity to provide connection capability of hundreds of billions of devices, so as to satisfy Internet of Things communication.

5G NR (New RAN) cells constitute a larger radio access network (RAN) area, and RAN areas constitute a larger tracking area. Therefore, each cell belongs to a RAN area and a tracking area. A tracking area is the basis for tracking a terminal in core network level, and a RAN area is the basis for tracking a terminal in radio access network level. A paging message sent by 5G RAN is broadcast on all cell groups in a Tracking Area (TA). Therefore, when a network is to send a downlink message or downlink data, the network needs to initiate paging to make user equipment (UE) return to connected mode (RRC_CONNECTED). However, in a current paging mechanism, all users within a current paging range need to perform continuous blind detection by traversing resource aggregation levels of an entire search space, to monitor whether there is a paging message for them. As a result, some or all of the user equipments continuously consume power at the same time, which causes energy waste.

SUMMARY

Embodiments of the present application provide a paging processing method and apparatus, a device, and a storage medium, to enhance a paging capability and effectively reduce energy consumption of a terminal.

According to a first aspect, a paging processing method is provided. The paging processing method includes: obtaining user equipment (UE) parameters that accept paging in a target cell, where the UE parameters include a UE number, and a quantity of UEs that currently accept paging in the target cell; obtaining paging parameters in a paging message, where the paging parameters include a quantity of paging frames included in one paging cycle corresponding to the paging message, a quantity of paging occasions included in one paging frame, a quantity of slots in each paging occasion, and a quantity of interval slots between two consecutive times of UE paging in one paging occasion, and the paging message includes paging downlink control information (DCI); determining, based on the UE parameters and the paging parameters, a target index position of paging DCI of an $i^{th}$ UE in a target slot in a target paging occasion in a target paging frame; and sending the target index position and the paging message to the $i^{th}$ UE, to indicate the $i^{th}$ UE to determine corresponding control resource information from the paging message based on the target index position.

According to the first aspect, the determining, based on the UE parameters and the paging parameters, a target index position of paging DCI of an $i^{th}$ UE in a target slot in a target paging occasion in a target paging frame includes: determining a paging density in the paging frame based on the quantity of UEs that currently accept paging and the quantity of paging frames included in one paging cycle; determining a quantity of UEs allocated in each paging occasion based on the paging density in the paging frame and the quantity of paging occasions included in one paging frame; determining a paging frame number of the $i^{th}$ UE based on the UE number and the paging density in the paging frame; determining a target paging frame of the $i^{th}$ UE based on the paging frame number of the $i^{th}$ UE, where the paging DCI of the $i^{th}$ UE is located in the target paging frame; determining a target paging occasion occupied by the $i^{th}$ UE from the target paging frame based on the UE number, the paging frame number of the $i^{th}$ UE, the paging density in the paging frame, and the quantity of UEs allocated in each paging occasion; determining a target slot index of the $i^{th}$ UE based on the UE number, the paging frame number of the $i^{th}$ UE, the paging density in the paging frame, the target paging occasion occupied by the $i^{th}$ UE, the quantity of UEs allocated in each paging occasion, and the quantity of interval slots between two consecutive times of UE paging in one paging occasion; and determining a target index position of paging DCI of the $i^{th}$ UE in a target slot in a target paging occasion in an $i^{th}$ paging frame based on the paging frame number of the $i^{th}$ UE, the quantity of paging occasions included in one paging frame, the target paging occasion occupied by the $i^{th}$ UE, the quantity of slots in each paging occasion, and the target slot index of the $i^{th}$ UE.

According to the first aspect, the determining a paging density in the paging frame based on the quantity of UEs that currently accept paging and the quantity of paging frames included in one paging cycle includes: determining the paging density in the paging frame based on a quotient of the quantity of UEs that currently accept paging divided by the quantity of paging frames included in one paging cycle.

According to the first aspect, the determining a quantity of UEs allocated in each paging occasion based on the paging density in the paging frame and the quantity of paging occasions included in one paging frame includes: determining the quantity of UEs allocated in each paging occasion based on a quotient of the paging density in the paging frame divided by the quantity of paging occasions included in one paging frame.

According to the first aspect, the determining a paging frame number of the $i^{th}$ UE based on the UE number and the paging density in the paging frame includes: determining the paging frame number of the $i^{th}$ UE based on a quotient of the UE number divided by the paging density in the paging frame.

According to the first aspect, the determining a target paging frame of the $i^{th}$ UE based on the paging frame number of the $i^{th}$ UE includes: if the paging frame number of the $i^{th}$ UE is less than 1, determining that the target paging frame of the $i^{th}$ UE is paging frame 0; if the paging frame number of the $i^{th}$ UE is greater than or equal to 1, and the paging frame number of the $i^{th}$ UE is less than 2, determining that the target paging frame of the $i^{th}$ UE is paging frame 1; if the paging frame number of the $i^{th}$ UE is greater than or equal to 2, and the paging frame number of the $i^{th}$ UE is less than 3, determining that the target paging frame of the $i^{th}$ UE is paging frame 2; or if the paging frame number of the $i^{th}$ UE is greater than or equal to n, and the paging frame number of the $i^{th}$ UE is less than (n+1), determining that the target paging frame of the $i^{th}$ UE is paging frame n, where $n \geq 3$.

According to the first aspect, the determining a target paging occasion occupied by the $i^{th}$ UE from the target paging frame based on the UE number, the paging frame number of the $i^{th}$ UE, the paging density in the paging frame, and the quantity of UEs allocated in each paging occasion includes: calculating a product of the paging frame number of the $i^{th}$ UE and the paging density in the paging frame to obtain a first calculation result; calculating a difference between the UE number and the first calculation result to obtain a second calculation result; and determining, based on a quotient of the second calculation result divided by the quantity of UEs allocated in each paging occasion, the target paging occasion occupied by the $i^{th}$ UE.

According to the first aspect, the determining a target slot index of the $i^{th}$ UE based on the UE number, the paging frame number of the $i^{th}$ UE, the paging density in the paging frame, the target paging occasion occupied by the $i^{th}$ UE, the quantity of UEs allocated in each paging occasion, and the quantity of interval slots between two consecutive times of UE paging in one paging occasion includes: calculating a product of the paging frame number of the $i^{th}$ UE and the paging density in the paging frame to obtain a first calculation result; calculating a product of the target paging occasion occupied by the $i^{th}$ UE and the quantity of UEs allocated in each paging occasion, to obtain a third calculation result; subtracting the first calculation result and the third calculation result from the UE number to obtain a fourth calculation result; and determining the target slot index of the $i^{th}$ UE based on a product of the fourth calculation result and the quantity of interval slots.

According to the first aspect, the determining a target index position of paging DCI of the $i^{th}$ UE in a target slot in a target paging occasion in an $i^{th}$ paging frame based on the paging frame number of the $i^{th}$ UE, the quantity of paging occasions included in one paging frame, the target paging occasion occupied by the $i^{th}$ UE, the quantity of slots in each paging occasion, and the target slot index of the $i^{th}$ UE includes: calculating a product of the paging frame number of the $i^{th}$ UE and the quantity of paging occasions included in one paging frame, to obtain a fifth calculation result; calculating a sum of the fifth calculation result and the target paging occasion occupied by the $i^{th}$ UE, to obtain a sixth calculation result; and multiplying the sixth calculation result and the quantity of slots in each paging occasion, and adding the target slot index of the $i^{th}$ UE to an obtained product, to determine the target index position of the paging DCI of the $i^{th}$ UE in the target slot in the target paging occasion in the $i^{th}$ paging frame.

According to a second aspect, a paging processing method is provided. The method includes: receiving a target index position and a paging message, where the target index position is used to indicate a target index position of paging DCI of a current user equipment (UE) in a target slot in a target paging occasion in an $i^{th}$ paging frame; and determining corresponding control resource information from the paging message based on the target index position.

According to a third aspect, a paging processing apparatus is provided. The apparatus includes: a first obtaining module, configured to obtain user equipment (UE) parameters that accept paging in a target cell, where the UE parameters include a UE number, and a quantity of UEs that currently accept paging in the target cell; a second obtaining module, configured to obtain paging parameters in a paging message, where the paging parameters include a quantity of paging frames included in one paging cycle corresponding to the paging message, a quantity of paging occasions included in one paging frame, a quantity of slots in each paging occasion, and a quantity of interval slots between two consecutive times of UE paging in one paging occasion, and the paging message includes paging downlink control information (DCI); a first determining module, configured to determine, based on the UE parameters and the paging parameters, a target index position of paging DCI of an $i^{th}$ UE in a target slot in a target paging occasion in a target paging frame; and a sending module, configured to send the target index position and the paging message to the $i^{th}$ UE, to indicate the $i^{th}$ UE to determine corresponding control resource information from the paging message based on the target index position.

According to a third aspect, the first determining module includes: a first determining submodule, configured to determine a paging density in the paging frame based on the quantity of UEs that currently accept paging and the quantity of paging frames included in one paging cycle; a second determining submodule, configured to determine a quantity of UEs allocated in each paging occasion based on the paging density in the paging frame and the quantity of paging occasions included in one paging frame; a third determining submodule, configured to determine a paging frame number of the $i^{th}$ UE based on the UE number and the paging density in the paging frame; a fourth determining submodule, configured to determine a target paging frame of the $i^{th}$ UE based on the paging frame number of the $i^{th}$ UE, where the paging DCI of the $i^{th}$ UE is located in the target paging frame; a fifth determining submodule, configured to determine a target paging occasion occupied by the $i^{th}$ UE from the target paging frame based on the UE number, the paging frame number of the $i^{th}$ UE, the paging density in the paging frame, and the quantity of UEs allocated in each paging occasion; a sixth determining submodule, configured to determine a target slot index of the $i^{th}$ UE based on the UE number, the paging frame number of the $i^{th}$ UE, the paging density in the paging frame, the target paging occasion occupied by the $i^{th}$ UE, the quantity of UEs allocated in each paging occasion, and the quantity of interval slots between two consecutive times of UE paging in one paging occasion; and a seventh determining submodule, configured to determine a target index position of paging DCI of the $i^{th}$ UE in a target slot in a target paging occasion in an $i^{th}$ paging frame based on the paging frame number of the $i^{th}$ UE, the quantity of paging occasions included in one paging frame, the target paging occasion occupied by the $i^{th}$ UE, the quantity of slots in each paging occasion, and the target slot index of the $i^{th}$ UE.

According to the third aspect, the first determining submodule is configured to determine the paging density in the paging frame based on a quotient of the quantity of UEs that currently accept paging divided by the quantity of paging frames included in one paging cycle.

According to the third aspect, the second determining submodule is configured to determine the quantity of UEs allocated in each paging occasion based on a quotient of the paging density in the paging frame divided by the quantity of paging occasions included in one paging frame.

According to the third aspect, the third determining submodule is configured to determine the paging frame number of the $i^{th}$ UE based on a quotient of the UE number divided by the paging density in the paging frame.

According to the third aspect, the fourth determining submodule is configured to: if the paging frame number of the $i^{th}$ UE is less than 1, determine that the target paging frame of the $i^{th}$ UE is paging frame 0; if the paging frame number of the $i^{th}$ UE is greater than or equal to 1, and the paging frame number of the $i^{th}$ UE is less than 2, determine that the target paging frame of the $i^{th}$ UE is paging frame 1; if the paging frame number of the $i^{th}$ UE is greater than or equal to 2, and the paging frame number of the $i^{th}$ UE is less than 3, determine that the target paging frame of the $i^{th}$ UE is paging frame 2; or if the paging frame number of the $i^{th}$ UE is greater than or equal to n, and the paging frame number of the $i^{th}$ UE is less than (n+1), determine that the target paging frame of the $i^{th}$ UE is paging frame n, where $n \geq 3$.

According to the third aspect, the fifth determining submodule is configured to: calculate a product of the paging frame number of the $i^{th}$ UE and the paging density in the paging frame to obtain a first calculation result; calculate a difference between the UE number and the first calculation result to obtain a second calculation result; and determine, based on a quotient of the second calculation result divided by the quantity of UEs allocated in each paging occasion, the target paging occasion occupied by the $i^{th}$ UE.

According to the third aspect, the sixth determining submodule is configured to: calculate a product of the paging frame number of the $i^{th}$ UE and the paging density in the paging frame to obtain a first calculation result; calculate a product of the target paging occasion occupied by the $i^{th}$ UE and the quantity of UEs allocated in each paging occasion, to obtain a third calculation result; subtract the first calculation result and the third calculation result from the UE number to obtain a fourth calculation result; and determine the target slot index of the $i^{th}$ UE based on a product of the fourth calculation result and the quantity of interval slots.

According to the third aspect, the seventh determining submodule is configured to: calculate a product of the paging frame number of the $i^{th}$ UE and the quantity of paging occasions included in one paging frame, to obtain a fifth calculation result; calculate a sum of the fifth calculation result and the target paging occasion occupied by the $i^{th}$ UE, to obtain a sixth calculation result; and multiply the sixth calculation result and the quantity of slots in each paging occasion, and add the target slot index of the $i^{th}$ UE to an obtained product, to determine the target index position of the paging DCI of the $i^{th}$ UE in the target slot in the target paging occasion in the $i^{th}$ paging frame.

According to a fourth aspect, a paging processing apparatus is provided. The apparatus includes: a receiving module, configured to receive a target index position and a paging message, where the target index position is used to indicate a target index position of paging DCI of a current user equipment (UE) in a target slot in a target paging occasion in an $i^{th}$ paging frame; and a second determining module, configured to determining corresponding control resource information from the paging message based on the target index position.

According to a fifth aspect, a network device is provided, where the network device includes a processor and a memory. The memory is configured to store a computer program, and the processor is configured to invoke and run the computer program stored in the memory to perform a paging processing method according to the first aspect.

According to a sixth aspect, a terminal device is provided, where the terminal device includes a processor and a memory. The memory is configured to store a computer program, and the processor is configured to invoke and run the computer program stored in the memory to perform a paging processing method according to the second aspect.

According to a seventh aspect, a chip is provided, where the chip includes a processor, and the processor is configured to invoke a computer program from a memory and run the computer program, so that a device provided with the chip performs a paging processing method according to any one of the first aspect or the second aspect, or implementations thereof.

According to an eighth aspect, a computer-readable storage medium is provided. The computer-readable storage medium stores a computer program, and the computer program is adapted to be loaded by a processor to perform a paging processing method according to any one of the first aspect or the second aspect, or implementations thereof.

According to a ninth aspect, a computer program product is provided. The computer program product includes computer program instructions, where the computer program instructions enable a computer to perform a paging processing method according to any one of the first aspect or the second aspect, or implementations thereof.

According to a tenth aspect, a computer program is provided. When the computer program is run on a computer, the computer is enabled to perform a paging processing method according to any one of the first aspect or the second aspect, or implementations thereof.

Beneficial Effects

The embodiments of the present application provide a paging processing method and apparatus, a device, and a storage medium. In the method, user equipment (UE) parameters that accept paging in a target cell are obtained, where the UE parameters include a UE number, and a quantity of UEs that currently accept paging in the target cell; paging parameters in a paging message are obtained, where the paging parameters include a quantity of paging frames included in one paging cycle corresponding to the paging message, a quantity of paging occasions included in one paging frame, a quantity of slots in each paging occasion, and a quantity of interval slots between two consecutive times of UE paging in one paging occasion, and the paging message includes paging downlink control information (DCI); a target index position of paging DCI of an $i^{th}$ UE in a target slot in a target paging occasion in a target paging frame is determined based on the UE parameters and the paging parameters; and the target index position and the paging message are sent to the $i^{th}$ UE, to indicate the $i^{th}$ UE to determine corresponding control resource information from the paging message based on the target index position. A network device in the embodiments of the present application first determines the target index position of paging DCI of the $i^{th}$ UE in a target slot in a target paging occasion in a target paging frame, and then sends the target index position and the paging message to the corresponding UE, so that the UE only needs to determine control resource information based on the target index position sent by a base station, and does not need to decode all paging frames in received paging DCI to find its own paging message. This enhances a paging capability, and reduces energy consumption of a terminal.

BRIEF DESCRIPTION OF THE DRAWINGS

To describe the technical solutions in embodiments of the present application more clearly, the drawings for describing the embodiments are briefly described below. Apparently, the drawings described below show only some of the embodiments of the present application, and persons skilled in the art may further derive other drawings from these drawings without creative efforts.

DESCRIPTIONS OF THE EMBODIMENTS

The following clearly and completely describes the technical solutions in the embodiments of the present application with reference to the accompanying drawings in the embodiments of the present application. Apparently, the described embodiments are only some rather than all of the embodiments of the present application. All other embodiments derived from the embodiments of the present application by people skilled in the art without creative efforts should fall within the protection scope of the present application.

Figure 1:
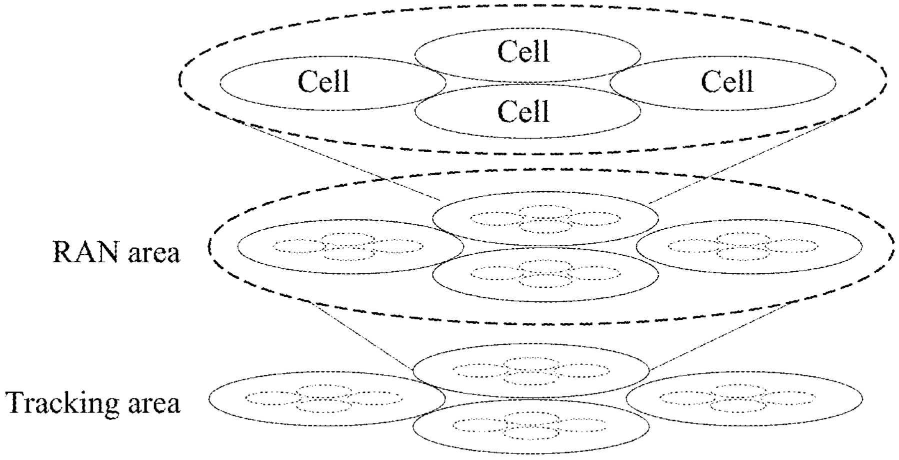
FIG. 1 is a schematic diagram of a network structure according to an embodiment of the present application.
Figure 2:
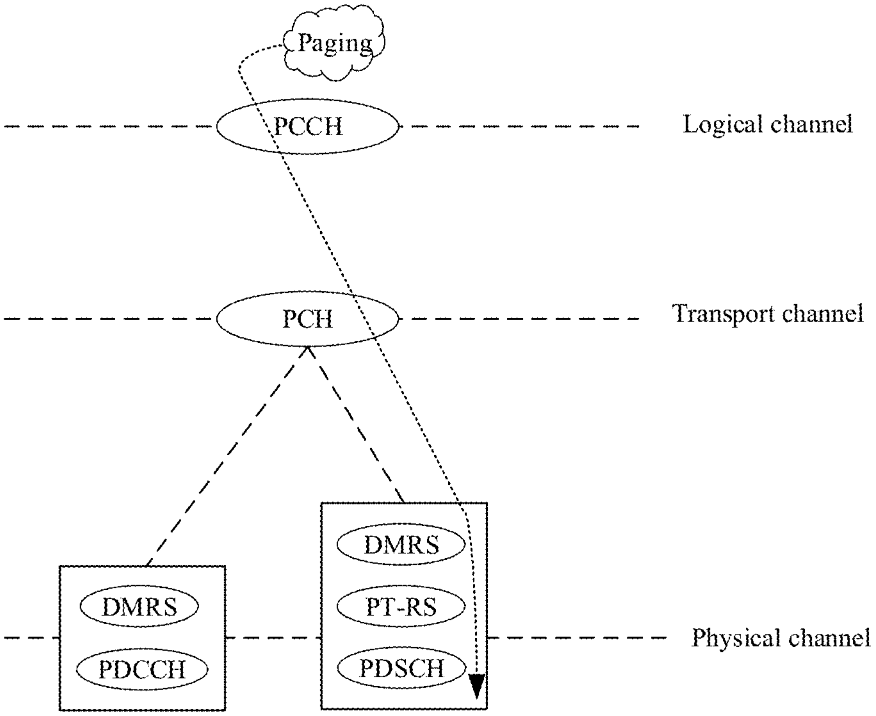
FIG. 2 is a logic diagram of paging according to an embodiment of the present application.

For example, FIG. 1 is a schematic diagram of a network structure, in which cells of 5G NR constitute a larger radio access network (RAN) area, and RAN areas constitute a larger tracking area. Therefore, each cell belongs to a RAN area and a tracking area. A tracking area is the basis for tracking a terminal in core network level, and a RAN area is the basis for tracking a terminal in radio access network level. A paging message sent by 5G RAN is broadcast on all cell groups in a TA. Therefore, when a network is to send a downlink message or downlink data, the network needs to initiate paging to make UE return to connected mode (RRC_CONNECTED). To transmit these signaling or data to the UE, a 5G core network (5GC) will trigger a paging process, with a current paging range from the TA area to a specific RAN area, that is, all users in the specific RAN area will accept the paging message. As shown in a logic diagram of paging in FIG. 2, an entire paging process involves mapping from a logical channel to a transport channel, and finally to a physical channel. A demodulation reference signal (DMRS) is a reference signal for demodulation. A paging message refers to paging message, transmitted based on a scheduled physical downlink control channel (PDCCH), received correctly by the UE that is paged by the core network. When the UE monitors a specific paging information radio network temporary identifier (PI-RNTI) indication carried in a paging message (carried on the PDCCH), demodulation is started, and a corresponding physical downlink shared channel (PDSCH) is decoded to extract its own paging message. The paging message may be downlink control information (DCI); the PI-RNTI may be expressed as a paging RNTI, which is used to parse a radio network temporary identifier (RNTI) in the paging message, corresponding to a paging control channel (PCCH) for paging; and the PDSCH is used to carry data from a DSCH transport channel. However, other users in the TA need to continuously perform blind detection (on the PDCCH and PDSCH) in order to monitor whether there is paging message for them. Therefore, the other users need to traverse resource aggregation levels of an entire search space, and in this case, a plurality of user equipments or all user equipments continuously consume power at the same time. In particular, a paging needs to be periodically detected by ULE in an idle (RRC_IDLE) state or an inactive (RRC_INACTIVE) state, or UE in an extended discontinuous reception (Extended DRX, eDRX) state or a power saving mode (PSM).

NR UE in idle/inactive mode needs to constantly monitor the channel for potential paging and further measures and examines a signal strength of a serving cell, and if needed, examines a neighbor cell for cell reselection. When UE monitors paging, UE needs to detect in a paging occasion, that is, a paging occasion (PO) for monitoring paging DCI, in a paging frame in a paging cycle, where a cyclic redundancy check (CRC) of the DCI is scrambled by paging radio network temporary identifier (P_RNTI) (identifiers of downlink paging and a system message change notice). If paging DCI is detected, the UE proceeds to a second step, in which the UE decodes a PDSCH of a temporary mobile station identity (Temporary Mobile Station Identity, TMSI) (5G-S-TMSI). Detailed information of frequency and time resource allocation of PDSCH is provided in the paging DCI. The UE only knows whether it is paged after successfully decoding the PDSCH (paging message). Both monitoring of an idle channel and frequent monitoring of paging DCI cause additional costs to the UE. Because the UE needs to be fully synchronized to be able to decode the paging DCI and the paging message, these additional costs may be more considerable in a scenario beyond a good signal coverage. A total additional cost depends on a paging probability and a manner of configuring PO/DRX for UEs with different paging probabilities. Generally, consumption of transition from deep sleep to deep sleep and synchronization required for the paging DCI and paging message accounts for about 50% to 60% of total average power consumption in one discontinuous reception (DRX) cycle.

Because these additional costs are a main source of energy waste, a paging enhancement solution is supposed to support the UE so that when a target UE is not paged, the UE can be prevented from entering these two states, that is, the UE can be prevented from transitioning from deep sleep to synchronization state or transitioning from synchronization state to deep sleep. To reduce power consumption of a terminal device, the present application proposes a paging signal processing method, to enhance a paging capability and greatly reduce power consumption of a user during a paging phase.

Figure 3:
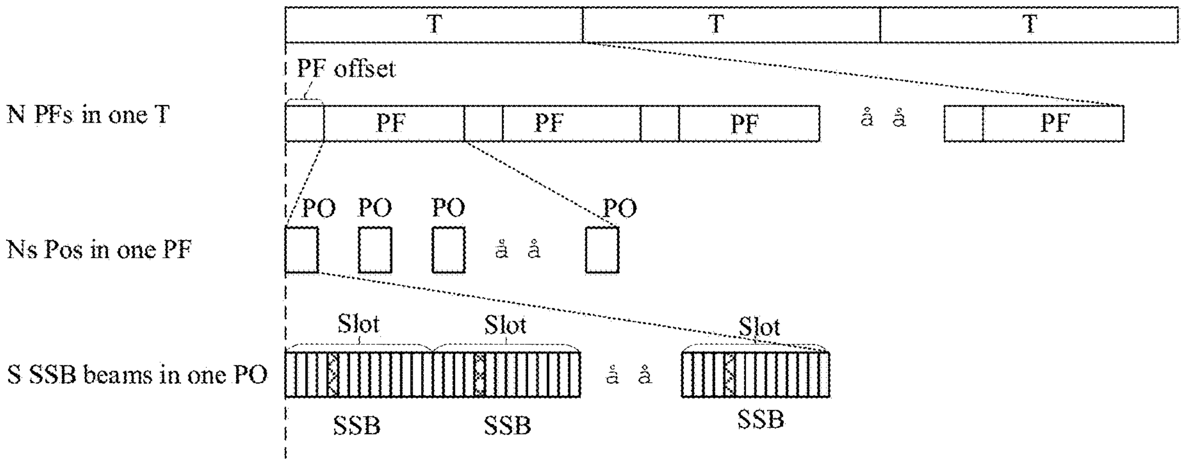
FIG. 3 is a schematic diagram of a paging mechanism according to an embodiment of the present application.

In a schematic diagram of a paging mechanism shown in FIG. 3, relevant terms in FIG. 3 include the following:

T: paging cycle, T=min(default paging cycle, UE-specific DRX cycle), for example, T is determined by the shortest DRX cycle. The default paging cycle is a paging cycle of a core network, and the UE-specific DRX cycle is a paging cycle on a wireless side. As the paging cycle on the wireless side is typically less than the paging cycle of the core network, T is equal to the paging cycle on the wireless side by default, that is, T is determined by the shortest DRX cycle.

PF (Paging Frame): Paging frame. The paging frame PF is a wireless frame, and one PF may include one or more paging occasions (PO).

PF_offset: PF frame offset.

N: A quantity of paging frames included in one paging cycle.

UE_ID: An identity of UE, for example, an international mobile subscriber identity (IMSI) or an S-temporary mobile subscriber identity (S-TMSI) of a terminal.

Ns: A quantity of paging occasions included in one paging frame.

PO (Paging Occasion): PO represents a paging occasion, that is, a set of PDCCH monitoring occasions, and one PO consists of a plurality of slots. One PO includes S SSB beams (S is determined by ssb-PositionsInBurst in a system information block 1 (SIB 1) message); one PO supports paging of a maximum of 32 UEs; and ssb-PositionsInBurst indicates a time domain position of a transmitted SS block in a half-frame including synchronization signal/physical broadcast channel (SS/PBCH) blocks. It can be understood that PO is a subframe of PF, and there may be a PDCCH on the PO that is scrambled with a P-RNTI and that indicates a paging (Paging) message. When DRX is used, UE needs to perform detection in only one PO in each DRX cycle. In other words, for each UE, only one subframe in each paging cycle can be used to send a paging message to the UE.

SSB (Static Shared Beam): Paging messages sent on SSB beams are exactly the same.

The paging frame (PF) refers to all system frame numbers (SFNs) that satisfy the following formula (1):

$$(SFN+PF\_\text{offset}) \bmod T=(T \text{ div } N)\times(UE\_ID \bmod N) \quad \text{(1), where}$$

div represents a division operation that returns an integer part of a final value; mod represents a remainder function that returns the remainder after division; values of all system frame numbers (SFNs) that satisfy the above formula are all PF; and the system frame number (SFN) represents a current frame number of UE.

A position i_s of a PO in the PF is calculated according to the following formula (2):

$$i\_s=\text{floor}(UE\_ID/N) \bmod Ns \quad \text{(2), where}$$

floor represents a floor operation. After the PF is calculated, a time when the UE receives the paging message can be known by calculating the position i_s of the PO in the PF.

Here, i_s indicates start positions of a set of PDCCH monitoring occasions, and the UE starts to continuously receive a paging message from an $i\_s^{th}$ PO. Therefore, all user equipments in idle mode (RRC_IDLE) in a cell need to periodically detect paging, that is, the user equipments need to search for their paging DCI in S slots in all paging occasions in a specific paging frame, which consumes excessive power of the user equipments.

Therefore, the present application proposes a new paging enhancement method, so that each UE does not need to detect paging in each slot or control resource set (CORESET) in each paging occasion in each paging cycle, greatly reducing power consumption of the user equipment.

Embodiments of the present application may be applied to various communications systems such as a global system for mobile communications (GSM), a code division multiple access (CDMA) system, a wideband code division multiple access (WCDMA) system, a general packet radio service (GPRS), a long term evolution (LTE) system, an advanced long term evolution (LTE-A) system, an NR system, an evolution system of an NR system, an LTE-based access to unlicensed spectrum (LTE-U) system, an NR-based access to unlicensed spectrum (NR-U) system, a universal mobile telecommunications system (UMTS), a wireless local area network (WLAN), wireless fidelity (Wi-Fi), a next generation communications system, or another communications system.

Generally, conventional communications systems support a limited number of connections and are also easy to implement. However, with the development of communication technologies, mobile communications systems will not only support conventional communication, but will also support, for example, device to device (D2D) communication, machine to machine (M2M) communication, machine type communication (MTC), and vehicle to vehicle (V2V) communication, and the embodiments of the present application may also be applied to these communications systems. In some embodiments, a communications system in the embodiments of the present application may be applied to a carrier aggregation (CA) scenario, a dual connectivity (DC) scenario, or a standalone (SA) networking scenario.

Figure 4:
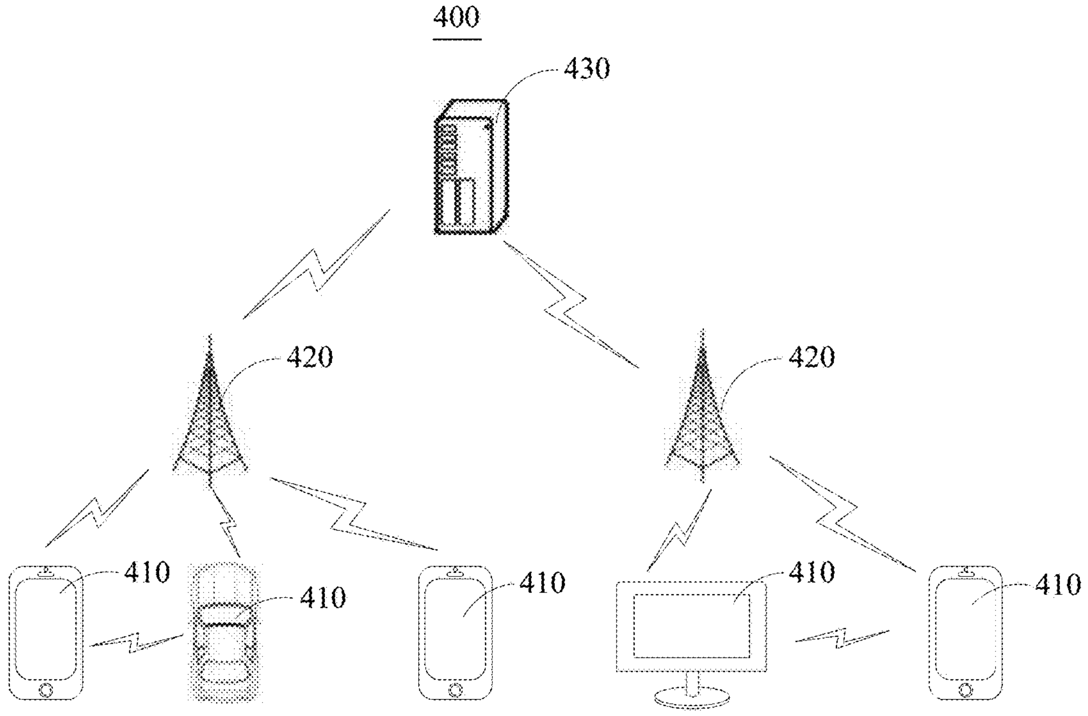
FIG. 4 is a schematic diagram of a first structure of a communications system according to an embodiment of the present application.

Referring to FIG. 4, FIG. 4 is a schematic structural diagram of a communications system according to an embodiment of the present application. The communications system 400 may include a plurality of terminal devices 410 and a plurality of network devices 420. Each network device 420 may provide communication coverage for a specific geographic area, and may communicate with a terminal device 410 located within the coverage area. FIG. 4 exemplarily shows three network devices and five terminal devices. The communications system may include a plurality of network devices and another quantity of terminal devices may be included within a coverage area of each network device, which is not limited by the embodiment of the present application.

The terminal device 410 may also be referred to as a user equipment (UE), an access terminal, a user unit, a user station, a mobile station, a distant station, a remote terminal, a mobile device, a user terminal, a terminal, a wireless communication device, a user proxy, a user apparatus, or the like. The terminal device 410 may be a station (ST) in a WLAN, or may be a cellular phone, a cordless phone, a session initiation protocol (SIP) phone, a wireless local loop (WLL) station, a personal digital assistant (PDA) device, a handheld device having a wireless communication function, a computing device or any other processing device connected to a wireless modem, a vehicle-mounted device, a wearable device, a terminal device in a next generation communications system such as an NR network or a future evolved public land mobile network (PLMN), or the like.

As an example rather than limitation, the terminal device 410 may alternatively be a wearable device. The wearable device may also be referred to as an intelligent wearable device, and is a general term of wearable devices such as glasses, gloves, watches, clothes, and shoes that are intelligently designed and developed based on daily wearing by using a wearable technology. Alternatively, the terminal device 410 may be an unmanned aerial vehicle device. Alternatively, the terminal device 410 may be a vehicle-mounted device, for example, may be an on-board computer having a wireless communication function, or a wireless user equipment externally connected to an on-board computer. Alternatively, the terminal device 410 may be a roadside device, for example, may be a street lamp, a traffic signal light, or another roadside device having a wireless communication function.

The network device 420 may be a device for communicating with a mobile device. The network device 420 may be an access point (AP) in a WLAN, a base transceiver station (BTS) in GSM or CDMA, a NodeB (NB) in WCDMA, an evolved NodeB (eNB or eNodeB) in LTE, a relay station or an access point, a vehicle-mounted device, a wearable device, a network device or a base station (gNB) in an NR network, a network device in a future evolved PLMN network, or the like.

In the embodiment of the present application, the network device 420 provides a service for a cell, and the terminal device 410 communicates with the network device 420 by using a transmission resource (for example, a frequency domain resource or a spectrum resource) used by the cell. The cell may be a cell corresponding to the network device 420 (for example, a base station). The cell may belong to a macro base station or belong to a base station corresponding to a small cell (Small cell). The small cell herein may include: a metro cell (Metro cell), a micro cell (Micro cell), a pico cell (Pico cell), a femto cell (Femto cell), or the like. These small cells feature small coverage and low transmission power, and are suitable for providing a high-speed data transmission service.

A wireless connection may be established between the network device 420 and the terminal device 410 through a wireless air interface.

For example, an end to end (E2E) connection may also be established between the terminal devices 410.

In some embodiments, the communications system may further include a network management device 430. A plurality of network devices 420 (base stations) each are connected to the network management device 430. The network management device 430 may be a core network device in a wireless communications system. For example, the network management device 430 may be a mobility management entity (MME) in an evolved packet core (EPC). Alternatively, the network management device may be another core network device, such as a 5G core network, a serving gateway (SGW), a public data network gateway (PGW), a policy and charging rules function (PCRF), or a home subscriber server (HSS). An implementation form of the network management device 430 is not limited in the embodiment of the present application.

It should be understood that, a multiple-input multiple-output (MIMO) technology may be used in the present application.

In the embodiment of the present application, the network device obtains user equipment (UE) parameters that accept paging in a target cell, where the UE parameters include a UE number, and a quantity of UEs that currently accept paging in the target cell; obtains paging parameters in a paging message, where the paging parameters include a quantity of paging frames included in one paging cycle corresponding to the paging message, a quantity of paging occasions included in one paging frame, a quantity of slots in each paging occasion, and a quantity of interval slots between two consecutive times of UE paging in one paging occasion, and the paging message includes paging downlink control information (DCI); determines, based on the UE parameters and the paging parameters, a target index position of paging DCI of an $i^{th}$ UE in a target slot in a target paging occasion in a target paging frame; and the network device sends the target index position and the paging message to the $i^{th}$ UE, to indicate the $i^{th}$ UE to determine corresponding control resource information from the paging message based on the target index position. The network device in the embodiment of the present application first determines the target index position of paging DCI of the $i^{th}$ UE in a target slot in a target paging occasion in a target paging frame, and then sends the target index position and the paging message to the corresponding UE, so that the UE only needs to determine control resource information based on the target index position sent by a base station, and does not need to decode all paging frames in received paging DCI to find its own paging message. This enhances a paging capability, and reduces energy consumption of the terminal.

Figure 5:
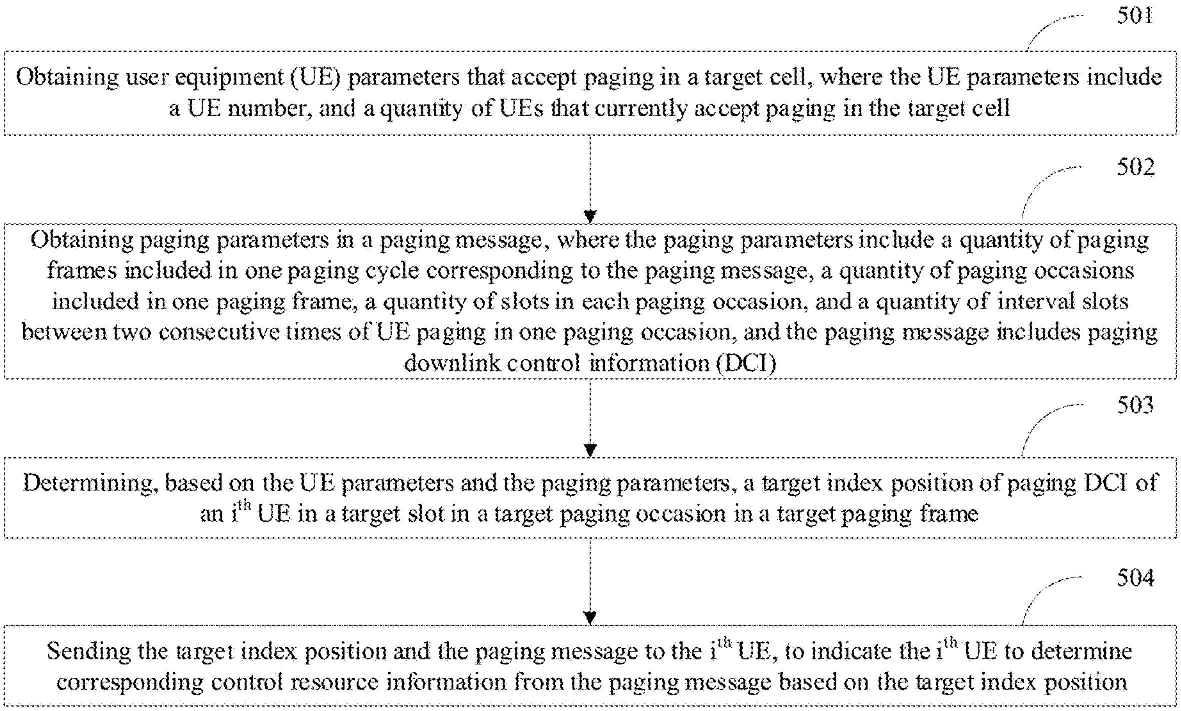
FIG. 5 is a schematic diagram of a first process of a paging processing method according to an embodiment of the present application.
Figure 6:
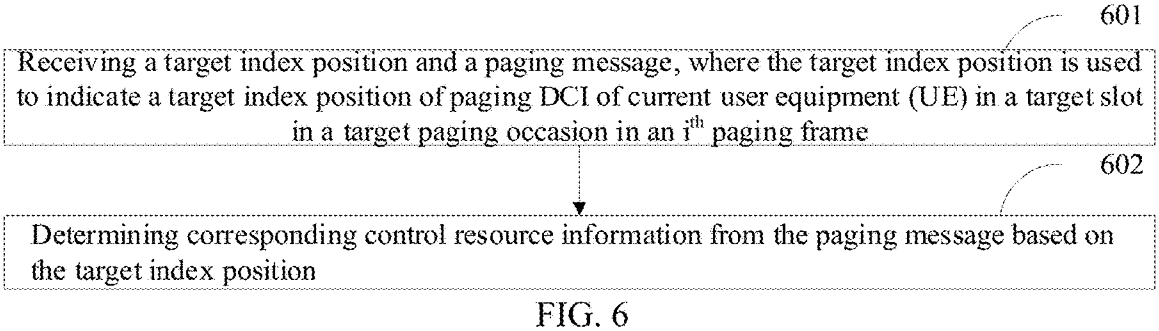
FIG. 6 is a schematic diagram of a second process of a paging processing method according to an embodiment of the present application.

Referring to FIG. 5, FIG. 5 is a schematic diagram of a first process of a paging processing method according to an embodiment of the present application. The method is applied to a network device, such as a base station. The method includes the following steps.

Step 501: Obtaining user equipment (UE) parameters that accept paging in a target cell, where the UE parameters include a UE number, and a quantity of UEs that currently accept paging in the target cell.

For example, a group of UE parameters that accept paging in the target cell are obtained. The UE parameters include a UE number, a terminal identity UE_ID(i) of each UE, and a quantity M of UEs that currently accept paging in the target cell, where for UE_ID (i), i=0, 1, 2, . . . , M−1, M represents the quantity of UEs that currently accept paging in the cell, i represents the UE number, and i takes values of: 0, 1, 2, . . . , M−1. For example, a maximum of 32 UEs in the target cell may accept paging, and generally 16 users receive paging. Here, UE_ID(i) has the same value as i, and therefore UE_ID(i) may also be used to indicate $i^{th}$ UE.

Step 502: Obtaining paging parameters in a paging message, where the paging parameters include a quantity of paging frames included in one paging cycle corresponding to the paging message, a quantity of paging occasions included in one paging frame, a quantity of slots in each paging occasion, and a quantity of interval slots between two consecutive times of UE paging in one paging occasion, and the paging message includes paging downlink control information (DCI).

Here, N may represent a quantity of paging frames included in one paging cycle, Ns may represent the quantity of paging occasions included in one paging frame, S may represent the quantity of slots in each paging occasion, and Ms may represent the quantity of interval slots between two consecutive times of UE paging in one paging occasion.

For example, when a paging message transmitted by a 5G core network is received, corresponding paging parameters may be obtained by analyzing the paging message.

Step 503: Determining, based on the UE parameters and the paging parameters, a target index position of paging DCI of the $i^{th}$ UE in a target slot in a target paging occasion in a target paging frame.

In some embodiments, step 503 may be implemented through the following steps 5031 to 5037.

Step 5031: Determining a paging density in the paging frame based on the quantity of UEs that currently accept paging and the quantity of paging frames included in one paging cycle.

Step 5032: Determining a quantity of UEs allocated in each paging occasion based on the paging density in the paging frame and the quantity of paging occasions included in one paging frame.

Step 5033: Determining a paging frame number of the $i^{th}$ UE based on the UE number and the paging density in the paging frame.

Step 5034: Determining a target paging frame of the $i^{th}$ UE based on the paging frame number of the $i^{th}$ UE, where the paging DCI of the $i^{th}$ UE is located in the target paging frame.

Step 5035: Determining a target paging occasion occupied by the $i^{th}$ UE from the target paging frame based on the UE number, the paging frame number of the $i^{th}$ UE, the paging density in the paging frame, and the quantity of UEs allocated in each paging occasion.

Step 5036: Determining a target slot index of the $i^{th}$ UE based on the UE number, the paging frame number of the $i^{th}$ UE, the paging density in the paging frame, the target paging occasion occupied by the $i^{th}$ UE, the quantity of UEs allocated in each paging occasion, and the quantity of interval slots between two consecutive times of UE paging in one paging occasion.

Step 5037: Determining a target index position of paging DCI of the $i^{th}$ UE in a target slot in a target paging occasion in an $i^{th}$ paging frame based on the paging frame number of the $i^{th}$ UE, the quantity of paging occasions included in one paging frame, the target paging occasion occupied by the $i^{th}$ UE, the quantity of slots in each paging occasion, and the target slot index of the $i^{th}$ UE.

In some embodiments, the determining a paging density in the paging frame based on the quantity of UEs that currently accept paging and the quantity of paging frames included in one paging cycle includes: determining the paging density in the paging frame based on a quotient of the quantity of UEs that currently accept paging divided by the quantity of paging frames included in one paging cycle.

Here, the paging density in the paging frame is determined based on a quotient of the quantity M of UEs that currently accept paging divided by the quantity N of paging frames included in one paging cycle. For example, $D_f$ represents the paging density in the paging frame, and $D_f$ can be calculated according to the following formula (3):

$$D_f=[M/N] \tag{3}$$

where

M represents the quantity of UEs that currently accept paging in the cell, that is, there are M UEs accept paging; N represents the quantity of paging frames included in one paging cycle; and [M/N] represents rounding a quotient of M divided by N to an integer.

In some embodiments, the determining a quantity of UEs allocated in each paging occasion based on the paging density in the paging frame and the quantity of paging occasions included in one paging frame includes: determining the quantity of UEs allocated in each paging occasion based on a quotient of the paging density in the paging frame divided by the quantity of paging occasions included in one paging frame.

Here, the quantity of UEs allocated in each paging occasion is determined based on a quotient of the paging density $D_f$ in the paging frame divided by the quantity Ns of paging occasions included in one paging frame. For example, $D_o$ represents the quantity of UEs allocated in each paging occasion. In principle, each UE is allocated a slot for paging. $D_o$ can be calculated according to the following formula (4):

$$D_o=[D_f/N_S] \tag{4}$$

where $D_f$ represents the paging density in the paging frame, Ns represents the quantity of paging occasions included in one paging frame, and $[D_f/N_S]$ represents rounding a quotient of $D_f$ divided by Ns to an integer.

In some embodiments, the determining a paging frame number of the $i^{th}$ UE based on the UE number and the paging density in the paging frame includes: determining the paging frame number of the $i^{th}$ UE based on a quotient of the UE number divided by the paging density in the paging frame.

Here, the paging frame number of the $i^{th}$ UE is determined based on a quotient of the UE number i divided by the paging density $D_f$ in the paging frame. For example, $PF_i$ represents a paging frame number of UE of UE_ID(i), and $PF_i$ can be calculated according to the following formula (5):

$$PF_i=i/D_f \tag{5}$$

where i represents the UE number, and i takes values of 0, 1, 2, . . . , M−1; and $D_f$ represents the paging density in the paging frame, that is, a quantity of paging UEs allocated in each paging frame. Here, a calculation result of $PF_i$ is an integer value of a result of the quotient of the UE number divided by the paging density in the paging frame.

In some embodiments, the determining a target paging frame of the $i^{th}$ UE based on the paging frame number of the $i^{th}$ UE includes:

if the paging frame number of the $i^{th}$ UE is less than 1, determining that the target paging frame of the $i^{th}$ UE is paging frame 0; or if the paging frame number of the $i^{th}$ UE is greater than or equal to 1, and the paging frame number of the $i^{th}$ UE is less than 2, determining that the target paging frame of the $i^{th}$ UE is paging frame 1; or if the paging frame number of the $i^{th}$ UE is greater than or equal to 2, and the paging frame number of the $i^{th}$ UE is less than 3, determining that the target paging frame of the $i^{th}$ UE is paging frame 2; or if the paging frame number of the $i^{th}$ UE is greater than or equal to n, and the paging frame number of the $i^{th}$ UE is less than (n+1), determining that the target paging frame of the $i^{th}$ UE is paging frame n, where $n \geq 3$.

In some embodiments, the determining a target paging frame of the $i^{th}$ UE based on the paging frame number of the $i^{th}$ UE includes: determining the target paging frame of the $i^{th}$ UE based on a multiple relationship between the UE number and the paging density in the paging frame.

For example, UE_ID(i) has the same value as i, and therefore, UE_ID(i) may also be used to indicate the $i^{th}$ UE. For example, if a value of the terminal identity is less than the paging density in the paging frame, that is, $UE\_ID(i)<D_f$, paging DCI of UE_ID(i) (the $i^{th}$ UE) is located on the paging frame 0;

- if a value of the terminal identity is greater than or equal to the paging density in the paging frame and less than twice the paging density in the paging frame, that is, $D_f \leq UE\_ID(i)<2D_f$, paging DCI of UE_ID(i) (the $i^{th}$ UE) is located on the paging frame 1;
- if a value of the terminal identity is greater than twice the paging density in the paging frame and less than three times the paging density in the paging frame, that is, $2D_f\ UE\_ID(i)<3D_f$, paging DCI of UE_ID(i) (the $i^{th}$ UE) is located on the paging frame 2; or
- if a value of the terminal identity is greater than n times the paging density in the paging frame and less than (n+1) times the paging density in the paging frame, that is, $nD_f \leq UE\_ID(i)<(n+1)D_f$, paging DCI of UE_ID(i) (the $i^{th}$ UE) is located on the paging frame n.

By analogy, an exact position of a target paging frame of UE_ID(i) (the $i^{th}$ UE) can be determined, avoiding a case in which the UE may detect a plurality of paging frames until the UE detects its own DCI in the paging cycle.

In some embodiments, the determining a target paging occasion occupied by the $i^{th}$ UE from the target paging frame based on the UE number, the paging frame number of the $i^{th}$ UE, the paging density in the paging frame, and the quantity of UEs allocated in each paging occasion includes:

- calculating a product of the paging frame number of the $i^{th}$ UE and the paging density in the paging frame to obtain a first calculation result;
- calculating a difference between the UE number and the first calculation result to obtain a second calculation result; and
- determining, based on a quotient of the second calculation result divided by the quantity of UEs allocated in each paging occasion, the target paging occasion occupied by the $i^{th}$ UE.

For example, $PO_i$ represents an $i^{th}$ paging occasion (a target paging occasion) occupied by the $i^{th}$ UE. There are a large number of paging occasions in one paging frame, and the paging occasion carries paging DCI. Based on the UE number i, the paging frame number $PF_i$ of the $i^{th}$ UE, the paging density $D_f$ in the paging frame, and the quantity $D_o$ of UEs allocated in each paging occasion, a position of a target paging occasion of a UE is determined, that is, the $i^{th}$ paging occasion occupied by the $i^{th}$ UE is determined, to prevent the UE from detecting in all paging occasions.

Specifically, a product of the paging frame number $PF_i$ of the $i^{th}$ UE and the paging density $D_f$ in the paging frame is calculated to obtain a first calculation result; a difference between the UE number i and the first calculation result is calculated to obtain a second calculation result; and the target paging occasion occupied by the $i^{th}$ UE is determined based on a quotient of the second calculation result divided by the quantity $D_o$ of UEs allocated in each paging occasion. The target paging occasion occupied by the $i^{th}$ UE can be understood as the $i^{th}$ paging occasion occupied by the $i^{th}$ UE, and the $i^{th}$ paging occasion occupied by the $i^{th}$ UE can be calculated according to the following formula (6):

$$PO_i=(i-PF_i\times D_f)\div D_o \tag{6}$$

In some embodiments, the determining a target slot index of the $i^{th}$ UE based on the UE number, the paging frame number of the $i^{th}$ UE, the paging density in the paging frame, the target paging occasion occupied by the $i^{th}$ UE, the quantity of UEs allocated in each paging occasion, and the quantity of interval slots between two consecutive times of UE paging in one paging occasion includes:

- calculating a product of the paging frame number of the $i^{th}$ UE and the paging density in the paging frame to obtain a first calculation result;
- calculating a product of the target paging occasion occupied by the $i^{th}$ UE and the quantity of UEs allocated in each paging occasion, to obtain a third calculation result;
- subtracting the first calculation result and the third calculation result from the UE number to obtain a fourth calculation result; and
- determining the target slot index of the $i^{th}$ UE based on a product of the fourth calculation result and the quantity of interval slots.

Here, Ms represents the quantity of interval slots between two consecutive times of UE paging in one paging occasion; and S represents the quantity of slots in each paging occasion, indicating that there are S slots in one paging occasion, and one specific slot may carry paging DCI. Therefore, a target slot index $S_{index(i)}$ of the $i^{th}$ UE may be determined based on the UE number i, the paging frame number $PF_i$ of the $i^{th}$ UE, the paging density $D_f$ in the paging frame, the target paging occasion $PO_i$ occupied by the $i^{th}$ UE, the quantity $D_o$ of UEs allocated in each paging occasion, and the quantity Ms of interval slots between two consecutive times of UE paging in one paging occasion.

For example, a paging slot of UE_ID(i) in a paging occasion is corresponding to the target slot index $S_{index}(i)$. Specifically, a product of the paging frame number $PF_i$ of the $i^{th}$ UE and the paging density $D_f$ in the paging frame is calculated to obtain a first calculation result; a product of the target paging occasion $PO_i$ occupied by the $i^{th}$ UE and the quantity $D_o$ of UEs allocated in each paging occasion is calculated to obtain a third calculation result; the first calculation result and the third calculation result are subtracted from the UE number i to obtain a fourth calculation result; and the target slot index of the $i^{th}$ UE is determined based on a product of the fourth calculation result and the quantity Ms of interval slots. The target slot index of the $i^{th}$ UE may be calculated according to the following formula (7):

$$S_{index(i)}=(i-PF_i\times D_f-PO_i\times D_o)\times Ms \tag{7}$$

In some embodiments, the determining a target index position of paging DCI of the $i^{th}$ UE in a target slot in a target paging occasion in an $i^{th}$ paging frame based on the paging frame number of the $i^{th}$ UE, the quantity of paging occasions included in one paging frame, the target paging occasion occupied by the $i^{th}$ UE, the quantity of slots in each paging occasion, and the target slot index of the $i^{th}$ UE includes:

- calculating a product of the paging frame number of the $i^{th}$ UE and the quantity of paging occasions included in one paging frame, to obtain a fifth calculation result;
- calculating a sum of the fifth calculation result and the target paging occasion occupied by the $i^{th}$ UE, to obtain a sixth calculation result; and multiplying the sixth calculation result and the quantity of slots in each paging occasion, and adding the target slot index of the $i^{th}$ UE to an obtained product, to determine the target index position of the paging DCI of the $i^{th}$ UE in the target slot in the target paging occasion in the $i^{th}$ paging frame.

A target index position of paging DCI of the $i^{th}$ UE in a target slot in a target paging occasion in the $i^{th}$ paging frame is determined based on the paging frame number $PF_i$ of the $i^{th}$ UE, the quantity Ns of paging occasions included in one paging frame, the target paging occasion $PO_i$ occupied by the $i^{th}$ UE, the quantity S of slots in each paging occasion, and the target slot index $S_{index(i)}$ of the $i^{th}$ UE.

Specifically, a product of the paging frame number $PF_i$ of the $i^{th}$ UE and the quantity Ns of paging occasions included in one paging frame is calculated to obtain a fifth calculation result; a sum of the fifth calculation result and the target paging occasion $PO_i$ occupied by the $i^{th}$ UE is calculated to obtain a sixth calculation result; and the sixth calculation result and the quantity S of slots in each paging occasion are multiplied, and the target slot index $S_{index(i)}$ of the $i^{th}$ UE is added to an obtained product, to determine the target index position of the paging DCI of the $i^{th}$ UE in the target slot in the target paging occasion in the $i^{th}$ paging frame. For example, a uniform number $S'_{index(i)}$ is given for the $i^{th}$ UE for a specific slot in a complete paging cycle, where the $S'_{index(i)}$ represents the target index position of the paging DCI of the it UE in the target slot in the target paging occasion in the $i^{th}$ paging frame, and can be calculated according to the following formula (8):

$$S'_{index(i)}=(PF_i \times N_S+PO_i)\times S+S_{index(i)} \tag{8}$$

where $S'_{index(i)}$ can be used to finally determine a target index position of paging DCI of the $i^{th}$ UE in a specific slot in a specific paging occasion in the $i^{th}$ paging frame. For example, according to the principle of equity, $S'_{index(1)}$ represents a target index position of paging DCI of the first user in the first slot $S_{index(1)}$ in the first paging occasion $PO_1$ in the first paging frame $PF_1$. Then, unified numbering is performed by analogy. Finally, $S'_{index(i)}$ represents a target index position of paging DCI of the $i^{th}$ UE in the $i^{th}$ slot $S_{index(i)}$ in the $i^{th}$ paging occasion $PO_i$ in the $i^{th}$ paging frame $PF_i$.

Step 504: Sending the target index position and the paging message to the $i^{th}$ UE, to indicate the $i^{th}$ UE to determine corresponding control resource information from the paging message based on the target index position.

The network device first determines the target index position of paging DCI of the $i^{th}$ UE in a target slot in a target paging occasion in a target paging frame, and then sends the target index position and the paging message to the corresponding UE, so that the UE only needs to determine control resource information based on the target index position sent by a base station, and does not need to decode all paging frames in received paging DCI to find its own paging message. This enhances a paging capability, and reduces energy consumption of the terminal.

All of the foregoing technical solutions may be randomly combined to form optional embodiments of the present application. Details are not described herein.

In the embodiments of the present application, the user equipment (UE) parameters that accept paging in the target cell are obtained, where the UE parameters include the UE number and the quantity of UEs that currently accept paging in the target cell; the paging parameters in the paging message are obtained, where the paging parameters include the quantity of paging frames included in one paging cycle corresponding to the paging message, the quantity of paging occasions included in one paging frame, the quantity of slots in each paging occasion, and the quantity of interval slots between two consecutive times of UE paging in one paging occasion, and the paging message includes paging downlink control information (DCI); the target index position of paging DCI of the $i^{th}$ UE in a target slot in a target paging occasion in a target paging frame is determined based on the UE parameters and the paging parameters; and the target index position and the paging message are sent to the $i^{th}$ UE, to indicate the $i^{th}$ UE to determine corresponding control resource information from the paging message based on the target index position. The network device in the embodiments of the present application first determines the target index position of paging DCI of the $i^{th}$ UE in a target slot in a target paging occasion in a target paging frame, and then sends the target index position and the paging message to the corresponding UE, so that the UE only needs to determine control resource information based on the target index position sent by a base station, and does not need to decode all paging frames in received paging DCI to find its own paging message. This enhances a paging capability, and reduces energy consumption of the terminal.

Referring to FIG. 6 to FIG. 10, FIG. 6 is a schematic diagram of a second process of a paging processing method according to an embodiment of the present application, and FIG. 7 to FIG. 10 are schematic diagrams of application scenarios according to embodiments of the present application. The method is applied to a terminal device, such as a user equipment UE. The method includes the following steps:

Step 601: Receiving a target index position and a paging message, where the target index position is used to indicate a target index position of paging DCI of a current user equipment (UE) in a target slot in a target paging occasion in an $i^{th}$ paging frame.

Step 602: Determining corresponding control resource information from the paging message based on the target index position.

For example, a UE that receives the target index position and the paging message is $i^{th}$ UE corresponding to UE_ID(i), and the $i^{th}$ UE determines control resource information corresponding to the $i^{th}$ UE from the paging message based on the received target index position. For an LTE system or NB-IOT system, an entire carrier bandwidth may be used to transmit a PDCCH. In the embodiment of the present application, UE_ID(i) can determine that its own paging DCI is on an index of a specific slot, so that the UE can find a resource corresponding to the target index position, that is, a paging message belonging to UE_ID(i), by using only the target index position of the target slot.

Figure 7:
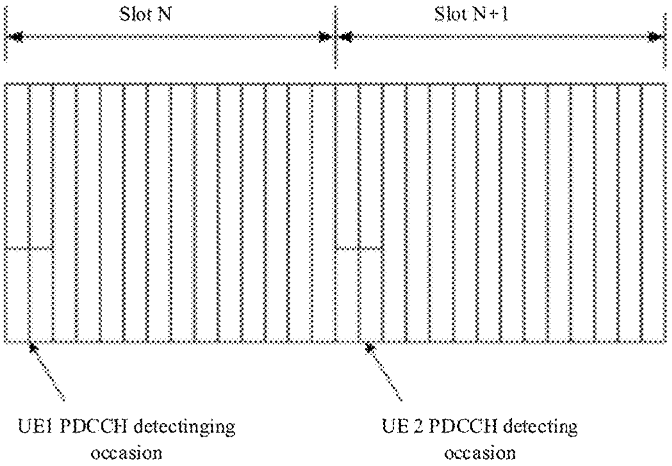
FIG. 7 is a slot diagram of PDCCH monitoring occasions according to an embodiment of the present application.
Figure 8:
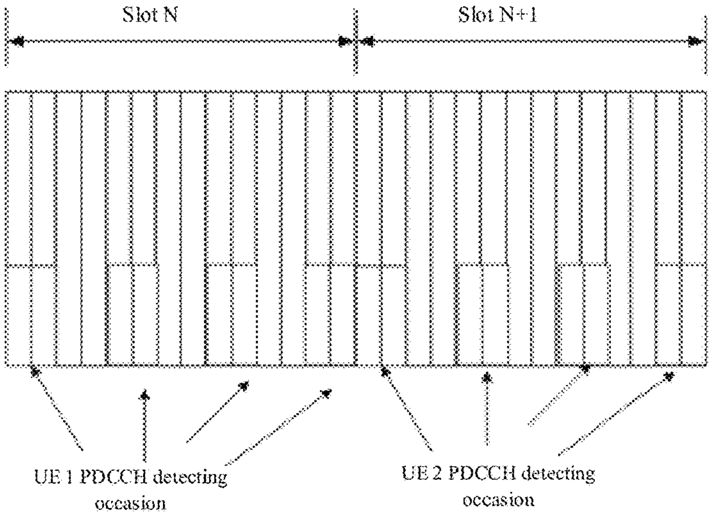
FIG. 8 is another slot diagram of PDCCH monitoring occasions according to an embodiment of the present application.
Figure 9:
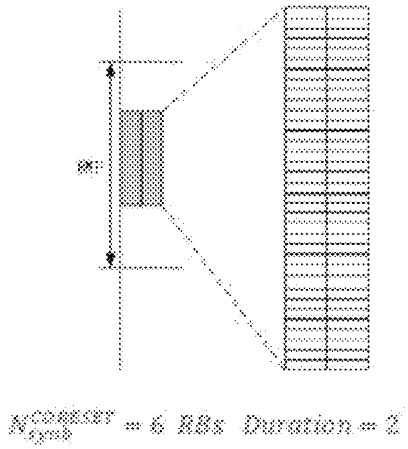
FIG. 9 is a resource mapping diagram according to an embodiment of the present application.

In terms of slot resources, PDCCH detecting occasions in each slot are shown in FIG. 7 and FIG. 8, and in LTE, downlink control information (DCI) is placed at a start position of the slot. A cycle number of detecting occasions is configured by radio resource control (Radio Resource Control, RRC). PDCCH is to transmit downlink control information (DCI) and one PDCCH allows only one format of DCI. A plurality of PDCCHs may be sent on one downlink subframe. A terminal device detects content transmitted on the PDCCH in the detecting occasion to determine its own paging message. The downlink control information (Downlink Control Information) transmitted on the PDCCH mainly includes: downlink scheduling information, uplink scheduling information, active and inactive physical uplink shared channel (PUSCH) scheduling, active and inactive PDSCH semi-persistent scheduling, a command to notify one or more UEs of a slot format, a command to notify one or more UEs of physical resource blocks (PRB) and orthogonal frequency division multiplex (OFDM) symbol resources that are no longer used, a transmit power control (TPC) command sent for PUCCH and PUSCH, a command to indicate of handover of a bandwidth part (BWP) of a total cell bandwidth, and control information for triggering a random access process or the like.

A control resource set (CORESET) is also introduced to 5G NR, and corresponding to a PDCCH physical resource configuration, CORESET includes a group of physical resource blocks (PRB) of a minimum quantity of 6 in frequency domain. Concepts of control channel element (CCE) and resource element group (REG) also exist in CORESET. A control channel is aggregated by control channel elements (CCEs), where one CCE includes 6 REGs. Interleaved and non-interleaved mapping from CCE to REG are both supported. One REG is made up of one resource block (RB) in frequency domain and one symbol in time domain. A CORESET includes {1,2,3} orthogonal frequency division multiplexing (OFDM) symbols in time domain length, and can be configured at a start position of the slot. At most 12 CORESETs (0-11) can be configured in each cell.

In CORESET, resource mapping modes from CCE to REG include an interleaved mode and a non-interleaved mode. For example, for the interleaved mode, mapping to the REG can be performed in a range of the entire CORESET through an interleaving function stipulated in the 3GPP 38.211 protocol, to obtain a frequency diversity gain. In addition, in a multi-cell scenario, assuming that a same resource mapping method is used between neighbor cells, mutual interference will be caused, while interleaved mapping may be performed as random mapping in the CORESET according to an interleaver, to implement random interference between the cells. For example, for the non-interleaved mode, although part of the frequency diversity gain is lost, a base station knows a downlink wireless channel in advance (especially in a TDD mode, a condition of the downlink wireless channel is obtained through uplink channel estimation according to channel reciprocity), the base station can schedule the PDCCH on a time-frequency resource with better channel quality, so as to obtain a scheduling gain. In the non-interleaved mode, 6 REGs form one CCE. When the CORESET includes one OFDM time domain symbol, REG indexes in the CCE are sorted in ascending order starting from 0 in frequency domain. When the CORESET includes a plurality of OFDM time domain symbols, the REG indexes in the CCE are sorted first in a time domain order and then in a frequency domain order.

Figure 10:
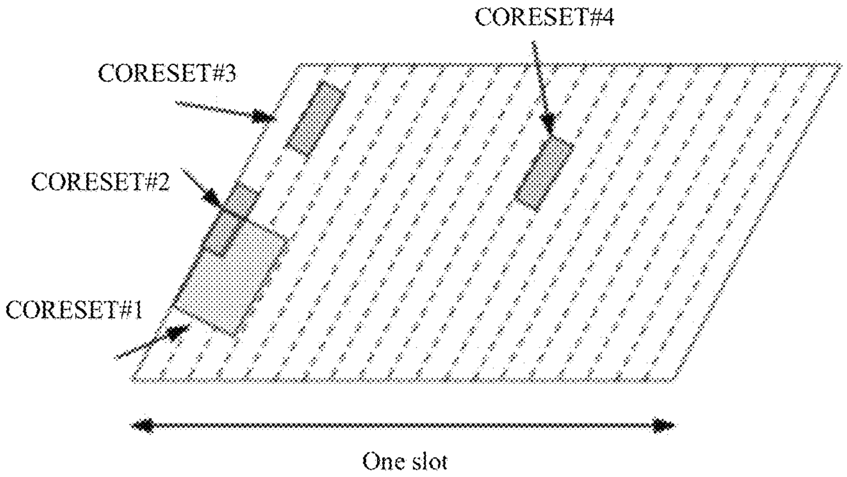
FIG. 10 is a schematic diagram of configuring a CORESET according to an embodiment of the present application.

A frequency domain position of the CORESET is indicated by an RRC layer parameter, that is, frequencyDomainResources, and a quantity of time domain symbols is indicated by duration. As shown in a resource mapping diagram in FIG. 9, a quantity of RBs in the CORESET is 6, and a quantity of symbols is 2. Therefore, a CORESET resource may be finally determined by determining a target index position of paging DCI of the $i^{th}$ UE in a specific slot in a specific paging occasion in the $i^{th}$ paging frame. CORESET is a concept of time and frequency, and on this control resource set, the terminal device tries to use one or more PDCCHs decoded in a search space. A start position of the PDCCH may be any position in the slot, and may be any position on a carrier in frequency domain. In a CORESET configuration example shown in FIG. 10, CORESET #1, CORESET #2, CORESET #3, and CORESET #4 shown in the figure indicate that the terminal device will receive the PDCCH at these positions in one slot. FIG. 10 shows a CORESET configuration diagram of UE-ID(i), and CORESET may be configured in the four manners shown in FIG. 10, or configured in another manner. The foregoing example is not intended to limit the embodiment of the present application.

If a terminal device is in idle mode (RRC_IDLE) or eDRX state for a long time, when the terminal device is woken up or when a timer reaches a specified time point, uplink and downlink time-frequency synchronization is usually required. Once the terminal device detects a primary synchronization signal (PSS), the terminal device will determine a transmission timing of a secondary synchronization signal (SSS). PSS is a pseudo-random sequence with a length of 127 using an M-sequence in frequency domain, where the M-sequence is cyclically shifted (three positions of cyclic shifting are 0, 43, and 86, respectively) to generate three different PSS sequences. PSS is the first signal that the UE will search for during cell search. The searching is a process with highest complexity. At this stage, the UE has no knowledge of timing information of a system, and a reference frequency inside the UE is inaccurate. Therefore, there are only three PSS sequences with a large interval of cyclic shift, so that the UE can distinguish between the PSS sequences. There are a large quantity of SSS sequences, for example, there are 336 different SSS sequences. The SSS is also a pseudo-random sequence with a length of 127 using an M-sequence in frequency domain. After synchronization, a process of channel estimation and analysis of a PBCH physical channel can be started, which accelerates a speed of cell access of the UE, and reduces a network delay of the system.

Figure 11:
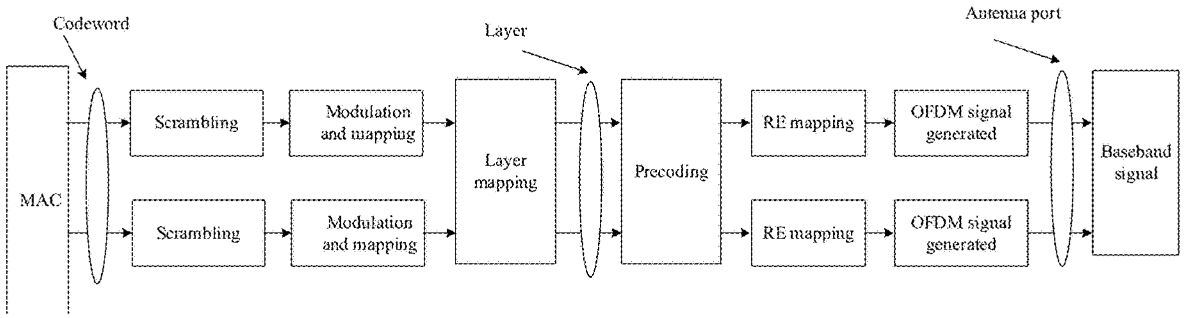
FIG. 11 is a flowchart of baseband processing according to an embodiment of the present application.

For example, when the UE receives its own paging message in a specific slot, a data transmission process of the PDSCH physical channel is shown in FIG. 11. A transport block (TB) from a media access control (MAC) layer is processed into a codeword stream, including operations such as channel coding, interleaving, and rate matching, followed by scrambling, data modulation mapping, layer mapping, precoding, RE mapping, and OFDM modulation, to generate an OFDM signal. Finally, the OFDM signal is sent to a corresponding antenna port to generate a final baseband signal.

The embodiment of the present application is applied to user equipment. The user equipment receives the target index position and the paging message, where the target index position is used to indicate a target index position of paging DCI of a current user equipment (UE) in a target slot in a target paging occasion in the $i^{th}$ paging frame; and determines the corresponding control resource information from the paging message based on the target index position. The network device in the embodiment of the present application first determines the target index position of paging DCI of the $i^{th}$ UE in a target slot in a target paging occasion in a target paging frame, and then sends the target index position and the paging message to the corresponding UE, so that the UE only needs to determine control resource information based on the target index position sent by a base station, and does not need to decode all paging frames in received paging DCI to find its own paging message. This enhances a paging capability, and reduces energy consumption of the terminal.

Figure 12:
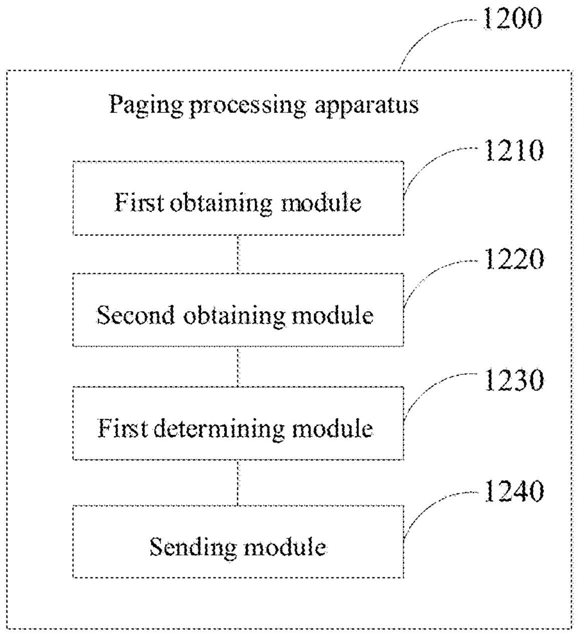
FIG. 12 is a schematic diagram of a first structure of a paging processing apparatus according to an embodiment of the present application.

For better implementation of the paging processing methods of the embodiments of the present application, an embodiment of the present application further provides a paging processing apparatus. Referring to FIG. 12, FIG. 12 is a schematic diagram of a first structure of a paging processing apparatus according to an embodiment of the present application. The paging processing apparatus 1200 includes:

a first obtaining module 1210, configured to obtain user equipment (UE) parameters that accept paging in a target cell, where the UE parameters include a UE number and a quantity of UEs that currently accept paging in the target cell;

a second obtaining module 1220, configured to obtain paging parameters in a paging message, where the paging parameters include a quantity of paging frames included in one paging cycle corresponding to the paging message, a quantity of paging occasions included in one paging frame, a quantity of slots in each paging occasion, and a quantity of interval slots between two consecutive times of UE paging in one paging occasion, and the paging message includes paging downlink control information (DCI);

a first determining module 1230, configured to determine, based on the UE parameters and the paging parameters, a target index position of paging DCI of an $i^{th}$ UE in a target slot in a target paging occasion in a target paging frame; and a sending module 1240, configured to send the target index position and the paging message to the $i^{th}$ UE, to indicate the $i^{th}$ UE to determine corresponding control resource information from the paging message based on the target index position.

In Some Embodiments, the First Determining Module 1230 Includes:

a first determining submodule, configured to determine a paging density in the paging frame based on the quantity of UEs that currently accept paging and the quantity of paging frames included in one paging cycle;

a second determining submodule, configured to determine a quantity of UEs allocated in each paging occasion based on the paging density in the paging frame and the quantity of paging occasions included in one paging frame;

a third determining submodule, configured to determine a paging frame number of the $i^{th}$ UE based on the UE number and the paging density in the paging frame;

a fourth determining submodule, configured to determine a target paging frame of the $i^{th}$ UE based on the paging frame number of the $i^{th}$ UE, where the paging DCI of the $i^{th}$ UE is located in the target paging frame;

a fifth determining submodule, configured to determine a target paging occasion occupied by the $i^{th}$ UE from the target paging frame based on the UE number, the paging frame number of the $i^{th}$ UE, the paging density in the paging frame, and the quantity of UEs allocated in each paging occasion;

a sixth determining submodule, configured to determine a target slot index of the $i^{t}$UE based on the UE number, the paging frame number of the $i^{th}$ UE, the paging density in the paging frame, the target paging occasion occupied by the $i^{th}$ UE, the quantity of UEs allocated in each paging occasion, and the quantity of interval slots between two consecutive times of UE paging in one paging occasion; and a seventh determining submodule, configured to determine a target index position of paging DCI of the $i^{th}$ UE in a target slot in a target paging occasion in an $i^{th}$ paging frame based on the paging frame number of the $i^{th}$ UE, the quantity of paging occasions included in one paging frame, the target paging occasion occupied by the $i^{th}$ UE, the quantity of slots in each paging occasion, and the target slot index of the $i^{th}$ UK.

In some embodiments, the first determining submodule is configured to determine the paging density in the paging frame based on a quotient of the quantity of UEs that currently accept paging divided by the quantity of paging frames included in one paging cycle.

In some embodiments, the second determining submodule is configured to determine the quantity of UEs allocated in each paging occasion based on a quotient of the paging density in the paging frame divided by the quantity of paging occasions included in one paging frame.

In some embodiments, the third determining submodule is configured to determine the paging frame number of the $i^{th}$ UE based on a quotient of the UE number divided by the paging density in the paging frame.

In Some Embodiments, the Fourth Determining Submodule is Configured to:

if the paging frame number of the $i^{th}$ UE is less than 1, determine that the target paging frame of the $i^{th}$ UE is paging frame 0;

if the paging frame number of the $i^{th}$ UE is greater than or equal to 1, and the paging frame number of the $i^{th}$ UE is less than 2, determine that the target paging frame of the $i^{th}$ UE is paging frame 1;

if the paging frame number of the $i^{th}$ UE is greater than or equal to 2, and the paging frame number of the $i^{th}$ UE is less than 3, determine that the target paging frame of the $i^{th}$ UE is paging frame 2; or if the paging frame number of the $i^{th}$ UE is greater than or equal to n, and the paging frame number of the $i^{th}$ UE is less than (n+1), determine that the target paging frame of the $i^{th}$ UE is paging frame n, where $n \geq 3$.

In some embodiments, the fifth determining submodule is configured to: calculate a product of the paging frame number of the $i^{th}$ UE and the paging density in the paging frame to obtain a first calculation result; calculate a difference between the UE number and the first calculation result to obtain a second calculation result; and determine, based on a quotient of the second calculation result divided by the quantity of UEs allocated in each paging occasion, the target paging occasion occupied by the $i^{th}$ UE.

In some embodiments, the sixth determining submodule is configured to: calculate a product of the paging frame number of the $i^{th}$ UE and the paging density in the paging frame to obtain a first calculation result; calculate a product of the target paging occasion occupied by the $i^{th}$ UE and the quantity of UEs allocated in each paging occasion, to obtain a third calculation result; subtract the first calculation result and the third calculation result from the UE number to obtain a fourth calculation result; and determine the target slot index of the $i^{th}$ UE based on a product of the fourth calculation result and the quantity of interval slots.

In some embodiments, the seventh determining submodule is configured to: calculate a product of the paging frame number of the $i^{th}$ UE and the quantity of paging occasions included in one paging frame, to obtain a fifth calculation result; calculate a sum of the fifth calculation result and the target paging occasion occupied by the $i^{th}$ UE, to obtain a sixth calculation result; and multiply the sixth calculation result and the quantity of slots in each paging occasion, and add the target slot index of the $i^{th}$ UE to an obtained product, to determine the target index position of the paging DCI of the $i^{th}$ UE in the target slot in the target paging occasion in the $i^{th}$ paging frame.

Figure 13:
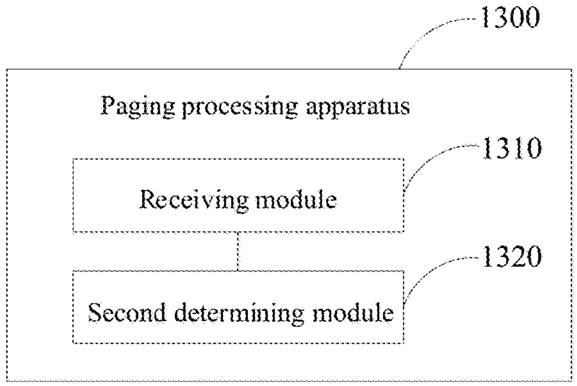
FIG. 13 is a schematic diagram of a second structure of a paging processing apparatus according to an embodiment of the present application.

Referring to FIG. 13, FIG. 13 is a schematic diagram of a second structure of a paging processing apparatus according to an embodiment of the present application. The paging processing apparatus 1300 includes:

a receiving module 1310, configured to receive a target index position and a paging message, where the target index position is used to indicate a target index position of paging DCI of a current user equipment (UE) in a target slot in a target paging occasion in an $i^{th}$ paging frame; and a second determining module 1320, configured to determine corresponding control resource information from the paging message based on the target index position.

All of the foregoing technical solutions may be randomly combined to form optional embodiments of the present application. Details are not described herein.

It should be understood that the apparatus embodiments may correspond to the method embodiments, and for similar descriptions, reference may be made to the method embodiments. To avoid repetition, details are not described herein again. Specifically, the apparatus shown in FIG. 12 or FIG. 13 may perform the foregoing paging processing method embodiments, and the above and other operations and/or functions of the units in the apparatus respectively implement the corresponding processes of the method embodiments. For brevity, details are not described herein again.

Figure 14:
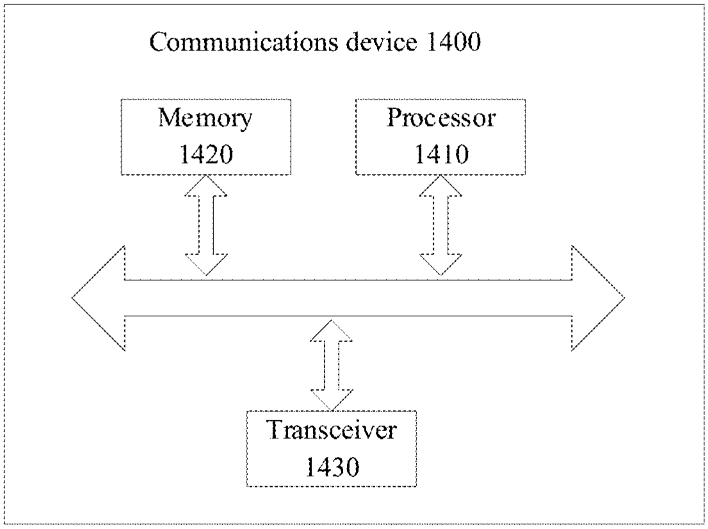
FIG. 14 is a schematic structural diagram of a communications device according to an embodiment of the present application.

FIG. 14 is a schematic structural diagram of a communications device according to an embodiment of the present application. The communications device 1400 shown in FIG. 14 includes a processor 1410, and the processor 1410 may invoke a computer program from a memory and run the computer program to implement the method in an embodiment of the present application.

In some embodiments, as shown in FIG. 14, the communications device 1400 may further include a memory 1420. The processor 1410 may invoke a computer program from the memory 1420 and run the computer program to implement the method in an embodiment of the present application.

The memory 1420 may be a separate device independent of the processor 1410, or may be integrated in the processor 1410.

In some embodiments, as shown in FIG. 14, the communications device 1400 may further include a transceiver 1430. The processor 1410 may control the transceiver 1430 to communicate with another device, specifically, may transmit information or data to the another device or receive information or data transmitted by the another device.

The transceiver 1430 may include a transmitter and a receiver. The transceiver 1430 may further include an antenna, and a quantity of antennas may be one or more.

In some embodiments, the communications device 1400 may be specifically the network device according to the embodiment of the present application, and the communications device 1400 may implement corresponding processes implemented by the network device (such as a base station) in various methods according to the embodiments of the present application. For brevity, details are not described herein again.

In some embodiments, the communications device 1400 may be specifically the terminal device according to the embodiment of the present application, and the communications device 1400 may implement corresponding processes implemented by the terminal device (such as user equipment) in various methods according to the embodiments of the present application. For brevity, details are not described herein again.

Figure 15:
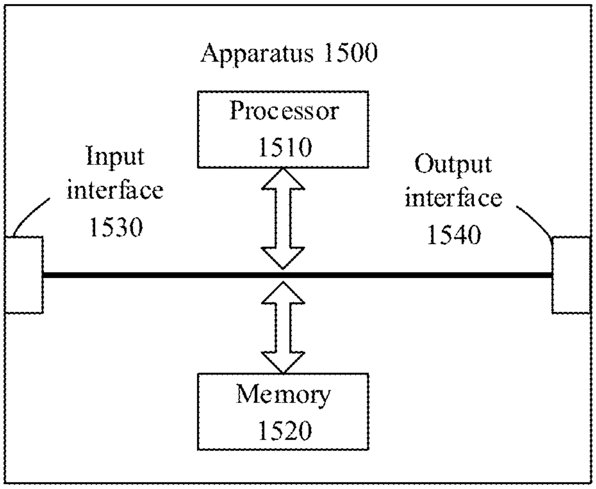
FIG. 15 is a schematic structural diagram of an apparatus according to an embodiment of the present application.

FIG. 15 is a schematic structural diagram of an apparatus according to an embodiment of the present application. The apparatus 1500 shown in FIG. 15 includes a processor 1510, and the processor 1510 may invoke a computer program from a memory and run the computer program to implement the method in an embodiment of the present application.

In some embodiments, as shown in FIG. 15, the apparatus 1500 may further include a memory 1520. The processor 1510 may invoke a computer program from the memory 1520 and run the computer program to implement the method in an embodiment of the present application.

The memory 1520 may be a separate device independent of the processor 1510, or may be integrated in the processor 1510.

In some embodiments, the apparatus 1500 may further include an input interface 1530. The processor 1510 may control the input interface 1530 to communicate with another device or chip, and specifically, may obtain information or data transmitted by the another device or chip.

In some embodiments, the apparatus 1500 may further include an output interface 1540. The processor 1510 may control the output interface 1540 to communicate with another device or chip, and specifically, may output information or data to the another device or chip.

In some embodiments, the apparatus may be applied to the network device in the embodiments of the present application, and the apparatus may implement the corresponding processes implemented by the network device in various methods of the embodiments of the present application. For brevity, details are not described herein again.

In some embodiments, the apparatus may be applied to the terminal device in the embodiments of the present application, and the apparatus may implement the corresponding processes implemented by the terminal device in various methods in the embodiments of the present application. For brevity, details are not described herein again.

In some embodiments, the apparatus mentioned in the embodiment of the present application may alternatively be a chip. For example, the chip may be a system-level chip, a system chip, a chip system, a system-on-chip, or the like.

Figure 16:
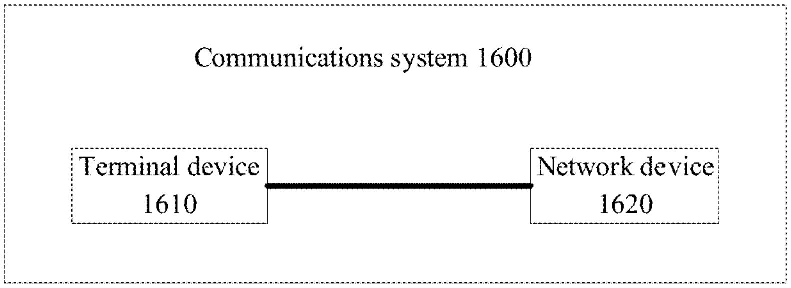
FIG. 16 is a schematic diagram of a second structure of a communications system according to an embodiment of the present application.

FIG. 16 is a schematic diagram of a second structure of a communications system 1600 according to an embodiment of the present application. As shown in FIG. 16, the communications system 1600 includes a terminal device 1610 and a network device 1620.

The terminal device 1610 may be used to implement corresponding functions implemented by the terminal device in the foregoing methods, and the network device 1620 may be used to implement corresponding functions implemented by the network device or the base station in the foregoing methods. For brevity, details are not described herein again.

It should be understood that, a processor in the embodiment of the present application may be an integrated circuit chip having a signal processing capability. In an implementation process, the steps in the foregoing method embodiments may be performed by using an integrated logic circuit of hardware of the processor or instructions in a software form. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor can implement or perform the methods, steps and logical block diagrams disclosed in the embodiments of the present application. The general-purpose processor may be a microprocessor, or the processor may be any conventional processor or the like. The steps of the methods disclosed with reference to the embodiments of the present application may be directly implemented by a hardware decoding processor, or may be implemented by a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in a memory. The processor reads information from the memory, and completes the steps of the foregoing methods in combination with hardware in the processor.

It may be understood that the memory in the embodiment of the present application may be a volatile memory or a nonvolatile memory, or may include both a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (Synchlink DRAM, SLDRAM), and a direct rambus random access memory (DR RAM). It should be noted that, the memory in the system and methods described in this specification includes but is not limited to these memories and any memory of another proper type.

It should be understood that, by way of example but not limitative description, for example, the memory in the embodiment of the present application may alternatively be a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory ESDRAM), a synchlink dynamic random access memory (SLDRAM), a direct rambus random access memory (DR RAM), or the like. In other words, the memory in the embodiment of the present application includes but is not limited to these memories and any memory of another proper type.

An embodiment of the present application further provides a computer-readable storage medium for storing a computer program.

In some embodiments, the computer-readable storage medium may be applied to the network device or the base station in the embodiments of the present application, and the computer program causes a computer to perform the corresponding processes implemented by the network device or the base station in various methods in the embodiments of the present application. For brevity, details are not described herein again.

In some embodiments, the computer-readable storage medium may be applied to the mobile terminal/terminal device/user equipment in the embodiments of the present application, and the computer program causes a computer to perform the corresponding processes implemented by the mobile terminal/terminal device/user equipment in various methods in the embodiments of the present application. For brevity, details are not described herein again.

An embodiment of the present application further provides a computer program product including computer program instructions.

In some embodiments, the computer program product may be applied to the network device or the base station in the embodiments of the present application, and the computer program instructions cause a computer to perform the corresponding processes implemented by the network device or the base station in various methods in the embodiments of the present application. For brevity, details are not described herein again.

In some embodiments, the computer program product may be applied to the mobile terminal/terminal device/user equipment in the embodiments of the present application, and the computer program instructions cause a computer to perform the corresponding processes implemented by the mobile terminal/terminal device/user equipment in various methods in the embodiments of the present application. For brevity, details are not described herein again.

An embodiment of the present application further provides a computer program.

In some embodiments, the computer program may be applied to the network device or the base station in the embodiments of the present application, and when the computer program is run on a computer, the computer is enabled to perform the corresponding processes implemented by the network device or the base station in various methods in the embodiments of the present application. For brevity, details are not described herein again.

In some embodiments, the computer program may be applied to the mobile terminal/terminal device in the embodiments of the present application, and when the computer program is run on a computer, the computer is enabled to perform the corresponding processes implemented by the mobile terminal/terminal device/user equipment in various methods in the embodiments of the present application. For brevity, details are not described herein again.

Persons of ordinary skill in the art may be aware that, units and algorithm steps in examples described in combination with the embodiments disclosed in this specification can be implemented by electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of the present application.

Persons skilled in the art that can clearly understand that, for the purpose of convenient and brief description, for detailed working processes of the foregoing system, apparatus, and unit, reference may be made to the corresponding processes in the foregoing method embodiments, and details are not described herein again.

In several embodiments provided in the present application, it should be understood that, the disclosed system, apparatus, and method may be implemented in other manners. For example, the described apparatus embodiments are merely examples. For example, the unit division or module division is merely logical function division and may be other division in actual implementation. For example, a plurality of units, modules, or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units or modules described as separate components may be or may not be physically separated, and the components displayed as units or modules may be or may not be physical units, that is, may be located in one place or distributed on a plurality of network units. Some or all of the units or modules may be selected according to an actual need to achieve the objectives of the solutions of the embodiments.

In addition, the functional units or modules in the embodiments of the present application may be integrated into one processing unit or module, or each of the units or modules may exist alone physically, or two or more units may be integrated into one unit, or two or more modules may be integrated into one module.

When the functions are implemented in a form of a software functional unit or module and sold or used as an independent product, the functions may be stored in a computer-readable storage medium. For such understanding, the essence of the technical solutions of the present application or the part contributing to the prior art, or some of the technical solutions may be represented in the form of software products. The computer software products are stored in a storage medium, and include a number of instructions to enable a computer device (which may be a personal computer, a server, a network device, or the like) to perform all or some of the steps of the methods described in various embodiments of the present application. The foregoing storage medium includes various media that may store a program code, such as a USB flash drive, a mobile hard disk, a read-only memory (Read-only Memory, ROM), a random access memory (Random Access Memory, RAM), a magnetic disk, or an optical disk.

The foregoing descriptions are merely specific implementations of the present application, but the protection scope of the present application is not limited thereto. Any variation or replacement readily figured out by persons skilled in the art within the technical scope disclosed in the present application shall fall within the protection scope of the present application. Therefore, the protection scope of the present application should be subject to the protection scope of the claims.

What is claimed is:

1. A paging processing method, comprising:

obtaining user equipment (UE) parameters for paging, wherein the UE parameters for paging comprise a quantity of one or more UEs to be paged in a target cell and a UE number for each of the one or more UEs to be paged;

obtaining paging parameters in a paging message, wherein the paging parameters comprise a quantity of paging frames comprised in one paging cycle corresponding to the paging message, a quantity of paging occasions comprised in one paging frame, a quantity of slots in each paging occasion, and a quantity of interval slots between two consecutive times of UE paging in one paging occasion, and the paging message associates with a paging downlink control information (DCI);

determining, based on the UE parameters for paging and the paging parameters, a target index position of the paging DCI of a UE in a target slot in a target paging occasion in a target paging frame; and sending the target index position and the paging message to the UE, to indicate the UE to determine corresponding control resource information from the paging message based on the target index position.

2. The paging processing method according to claim 1, wherein the determining, based on the UE parameters for paging and the paging parameters, a target index position of the paging DCI of a UE in a target slot in a target paging occasion in a target paging frame comprises:

determining a paging density in the paging frame based on the quantity of one or more UEs to be paged and the quantity of paging frames comprised in one paging cycle;

determining a quantity of UEs allocated in each paging occasion based on the paging density in the paging frame and the quantity of paging occasions comprised in one paging frame;

determining a paging frame number of the UE based on the UE number of the UE and the paging density in the paging frame;

determining a target paging frame of the UE based on the paging frame number of the UE, wherein the paging DCI of the UE is located in the target paging frame;

determining a target paging occasion occupied by the UE from the target paging frame based on the UE number of the UE, the paging frame number of the UE, the paging density in the paging frame, and the quantity of UEs allocated in each paging occasion;

determining a target slot index of the UE based on the UE number of the UE, the paging frame number of the UE, the paging density in the paging frame, the target paging occasion occupied by the UE, the quantity of UEs allocated in each paging occasion, and the quantity of interval slots between two consecutive times of UE paging in one paging occasion; and determining a target index position of the paging DCI of the UE in a target slot in a target paging occasion in a paging frame based on the paging frame number of the UE, the quantity of paging occasions comprised in one paging frame, the target paging occasion occupied by the UE, the quantity of slots in each paging occasion, and the target slot index of the UE.

3. The paging processing method according to claim 2, wherein the determining a paging density in the paging frame based on the quantity of one or more UEs to be paged and the quantity of paging frames comprised in one paging cycle comprises:

determining the paging density in the paging frame based on a quotient of the quantity of one or more UEs to be paged divided by the quantity of paging frames comprised in one paging cycle.

4. The paging processing method according to claim 2, wherein the determining a quantity of UEs allocated in each paging occasion based on the paging density in the paging frame and the quantity of paging occasions comprised in one paging frame comprises:

determining the quantity of UEs allocated in each paging occasion based on a quotient of the paging density in the paging frame divided by the quantity of paging occasions comprised in one paging frame.

5. The paging processing method according to claim 2, wherein the determining a paging frame number of the UE based on the UE number of the UE and the paging density in the paging frame comprises:

determining the paging frame number of the UE based on a quotient of the UE number divided by the paging density in the paging frame.

6. The paging processing method according to claim 2, wherein the determining a target paging frame of the UE based on the paging frame number of the UE comprises:

if the paging frame number of the UE is less than 1, determining that the target paging frame of the UE is paging frame 0;

if the paging frame number of the UE is greater than or equal to 1, and the paging frame number of the UE is less than 2, determining that the target paging frame of the UE is paging frame 1;

if the paging frame number of the UE is greater than or equal to 2, and the paging frame number of the UE is less than 3, determining that the target paging frame of the UE is paging frame 2; or if the paging frame number of the UE is greater than or equal to n, and the paging frame number of the UE is less than n+1, determining that the target paging frame of the UE is paging frame n, wherein n≥3.

7. The paging processing method according to claim 2, wherein the determining a target paging occasion occupied by the UE from the target paging frame based on the UE number of the UE, the paging frame number of the UE, the paging density in the paging frame, and the quantity of UEs allocated in each paging occasion comprises:

calculating a product of the paging frame number of the UE and the paging density in the paging frame to obtain a first calculation result;

calculating a difference between the UE number of the UE and the first calculation result to obtain a second calculation result; and determining, based on a quotient of the second calculation result divided by the quantity of UEs allocated in each paging occasion, the target paging occasion occupied by the UE.

8. The paging processing method according to claim 2, wherein the determining a target slot index of the UE based on the UE number of the UE, the paging frame number of the UE, the paging density in the paging frame, the target paging occasion occupied by the UE, the quantity of UEs allocated in each paging occasion, and the quantity of interval slots between two consecutive times of UE paging in one paging occasion comprises:

calculating a product of the paging frame number of the UE and the paging density in the paging frame to obtain a first calculation result;

calculating a product of the target paging occasion occupied by the UE and the quantity of UEs allocated in each paging occasion, to obtain a third calculation result;

subtracting the first calculation result and the third calculation result from the UE number of the UE to obtain a fourth calculation result; and determining the target slot index of the UE based on a product of the fourth calculation result and the quantity of interval slots.

9. The paging processing method according to claim 2, wherein the determining a target index position of the paging DCI of the UE in a target slot in a target paging occasion in a paging frame based on the paging frame number of the UE, the quantity of paging occasions comprised in one paging frame, the target paging occasion occupied by the UE, the quantity of slots in each paging occasion, and the target slot index of the UE comprises:

calculating a product of the paging frame number of the UE and the quantity of paging occasions comprised in one paging frame, to obtain a fifth calculation result;

calculating a sum of the fifth calculation result and the target paging occasion occupied by the UE, to obtain a sixth calculation result; and multiplying the sixth calculation result and the quantity of slots in each paging occasion, and adding the target slot index of the UE to an obtained product, to determine the target index position of the paging DCI of the UE in the target slot in the target paging occasion in the paging frame.

10. A network device, comprising:

at least one processor;

one or more non-transitory computer-readable storage media coupled to the at least one processor and storing programming instructions for execution by the at least one processor, wherein the programming instructions, when executed, cause the network device to perform operations comprising:

obtaining user equipment (UE) parameters for paging, wherein the UE parameters for paging comprise a quantity of one or more UEs to be paged in a target cell and a UE number for each of the one or more UEs to be paged;

obtaining paging parameters in a paging message, wherein the paging parameters comprise a quantity of paging frames comprised in one paging cycle corresponding to the paging message, a quantity of paging occasions comprised in one paging frame, a quantity of slots in each paging occasion, and a quantity of interval slots between two consecutive times of UE paging in one paging occasion, and the paging message associates with a paging downlink control information (DCI);

determining, based on the UE parameters for paging and the paging parameters, a target index position of the paging DCI of a UE in a target slot in a target paging occasion in a target paging frame; and sending the target index position and the paging message to the UE, to indicate the UE to determine corresponding control resource information from the paging message based on the target index position.

11. The network device according to claim 10, wherein the determining, based on the UE parameters for paging and the paging parameters, a target index position of the paging DCI of a UE in a target slot in a target paging occasion in a target paging frame comprises:

determining a paging density in the paging frame based on the quantity of one or more UEs to be paged and the quantity of paging frames comprised in one paging cycle;

determining a quantity of UEs allocated in each paging occasion based on the paging density in the paging frame and the quantity of paging occasions comprised in one paging frame;

determining a paging frame number of the UE based on the UE number of the UE and the paging density in the paging frame;

determining a target paging frame of the UE based on the paging frame number of the UE, wherein the paging DCI of the UE is located in the target paging frame;

determining a target paging occasion occupied by the UE from the target paging frame based on the UE number of the UE, the paging frame number of the UE, the paging density in the paging frame, and the quantity of UEs allocated in each paging occasion;

determining a target slot index of the UE based on the UE number of the UE, the paging frame number of the UE, the paging density in the paging frame, the target paging occasion occupied by the UE, the quantity of UEs allocated in each paging occasion, and the quantity of interval slots between two consecutive times of UE paging in one paging occasion; and determining a target index position of the paging DCI of the UE in a target slot in a target paging occasion in a paging frame based on the paging frame number of the UE, the quantity of paging occasions comprised in one paging frame, the target paging occasion occupied by the UE, the quantity of slots in each paging occasion, and the target slot index of the UE.

12. The network device according to claim 11, wherein the determining a paging density in the paging frame based on the quantity of one or more UEs to be paged and the quantity of paging frames comprised in one paging cycle comprises:

determining the paging density in the paging frame based on a quotient of the quantity of one or more UEs to be paged divided by the quantity of paging frames comprised in one paging cycle.

13. The network device according to claim 11, wherein the determining a quantity of UEs allocated in each paging occasion based on the paging density in the paging frame and the quantity of paging occasions comprised in one paging frame comprises:

determining the quantity of UEs allocated in each paging occasion based on a quotient of the paging density in the paging frame divided by the quantity of paging occasions comprised in one paging frame.

14. The network device according to claim 11, wherein the determining a paging frame number of the UE based on the UE number of the UE and the paging density in the paging frame comprises:

determining the paging frame number of the UE based on a quotient of the UE number divided by the paging density in the paging frame.

15. The network device according to claim 11, wherein the determining a target paging frame of the UE based on the paging frame number of the UE comprises:

if the paging frame number of the UE is less than 1, determining that the target paging frame of the UE is paging frame 0;

if the paging frame number of the UE is greater than or equal to 1, and the paging frame number of the UE is less than 2, determining that the target paging frame of the UE is paging frame 1;

if the paging frame number of the UE is greater than or equal to 2, and the paging frame number of the UE is less than 3, determining that the target paging frame of the UE is paging frame 2; or if the paging frame number of the UE is greater than or equal to n, and the paging frame number of the UE is less than n+1, determining that the target paging frame of the UE is paging frame n, wherein n≥3.

16. The network device according to claim 11, wherein the determining a target paging occasion occupied by the UE from the target paging frame based on the UE number of the UE, the paging frame number of the UE, the paging density in the paging frame, and the quantity of UEs allocated in each paging occasion comprises:

calculating a product of the paging frame number of the UE and the paging density in the paging frame to obtain a first calculation result;

calculating a difference between the UE number of the UE and the first calculation result to obtain a second calculation result; and determining, based on a quotient of the second calculation result divided by the quantity of UEs allocated in each paging occasion, the target paging occasion occupied by the UE.

17. The network device according to claim 11, wherein the determining a target slot index of the UE based on the UE number of the UE, the paging frame number of the UE, the paging density in the paging frame, the target paging occasion occupied by the UE, the quantity of UEs allocated in each paging occasion, and the quantity of interval slots between two consecutive times of UE paging in one paging occasion comprises:

calculating a product of the paging frame number of the UE and the paging density in the paging frame to obtain a first calculation result;

calculating a product of the target paging occasion occupied by the UE and the quantity of UEs allocated in each paging occasion, to obtain a third calculation result;

subtracting the first calculation result and the third calculation result from the UE number of the UE to obtain a fourth calculation result; and determining the target slot index of the UE based on a product of the fourth calculation result and the quantity of interval slots.

18. The network device according to claim 11, wherein the determining a target index position of the paging DCI of the UE in a target slot in a target paging occasion in a paging frame based on the paging frame number of the UE, the quantity of paging occasions comprised in one paging frame, the target paging occasion occupied by the UE, the quantity of slots in each paging occasion, and the target slot index of the UE comprises:

calculating a product of the paging frame number of the UE and the quantity of paging occasions comprised in one paging frame, to obtain a fifth calculation result;

calculating a sum of the fifth calculation result and the target paging occasion occupied by the UE, to obtain a sixth calculation result; and multiplying the sixth calculation result and the quantity of slots in each paging occasion, and adding the target slot index of the UE to an obtained product, to determine the target index position of the paging DCI of the UE in the target slot in the target paging occasion in the paging frame.

19. One or more non-transitory computer-readable media storing computer instructions, that when executed by one or more processors, cause a computer to perform operations comprising:

obtaining user equipment (UE) parameters for paging, wherein the UE parameters for paging comprise a quantity of one or more UEs to be paged in a target cell and a UE number for each of the one or more UEs to be paged;

obtaining paging parameters in a paging message, wherein the paging parameters comprise a quantity of paging frames comprised in one paging cycle corresponding to the paging message, a quantity of paging occasions comprised in one paging frame, a quantity of slots in each paging occasion, and a quantity of interval slots between two consecutive times of UE paging in one paging occasion, and the paging message associates with a paging downlink control information (DCI);

determining, based on the UE parameters for paging and the paging parameters, a target index position of the paging DCI of a UE in a target slot in a target paging occasion in a target paging frame; and sending the target index position and the paging message to the UE, to indicate the UE to determine corresponding control resource information from the paging message based on the target index position.

20. The one or more non-transitory computer-readable media according to claim 19, wherein the determining, based on the UE parameters for paging and the paging parameters, a target index position of the paging DCI of a UE in a target slot in a target paging occasion in a target paging frame comprises:

determining a paging density in the paging frame based on the quantity of one or more UEs to be paged and the quantity of paging frames comprised in one paging cycle;

determining a quantity of UEs allocated in each paging occasion based on the paging density in the paging frame and the quantity of paging occasions comprised in one paging frame;

determining a paging frame number of the UE based on the UE number of the UE and the paging density in the paging frame;

determining a target paging frame of the UE based on the paging frame number of the UE, wherein the paging DCI of the UE is located in the target paging frame;

determining a target paging occasion occupied by the UE from the target paging frame based on the UE number of the UE, the paging frame number of the UE, the paging density in the paging frame, and the quantity of UEs allocated in each paging occasion;

determining a target slot index of the UE based on the UE number of the UE, the paging frame number of the UE, the paging density in the paging frame, the target paging occasion occupied by the UE, the quantity of UEs allocated in each paging occasion, and the quantity of interval slots between two consecutive times of UE paging in one paging occasion; and determining a target index position of the paging DCI of the UE in a target slot in a target paging occasion in a paging frame based on the paging frame number of the UE, the quantity of paging occasions comprised in one paging frame, the target paging occasion occupied by the UE, the quantity of slots in each paging occasion, and the target slot index of the UE.

* * * * *